US009927038B2

(12) United States Patent
Adamo et al.

(10) Patent No.: US 9,927,038 B2
(45) Date of Patent: Mar. 27, 2018

(54) PRESSURE CONTROL IN FLUIDIC SYSTEMS

(71) Applicant: Massachusetts Institute of Technology, Cambridge, MA (US)

(72) Inventors: Andrea Adamo, Cambridge, MA (US); Alexander P. Clayton, Mascoutac, IL (US); Patrick Louis Heider, Midland, MI (US); Nopphon Weeranoppanant, Cambridge, MA (US); Klavs F. Jensen, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 33 days.

(21) Appl. No.: 14/420,683

(22) PCT Filed: Aug. 9, 2013

(86) PCT No.: PCT/US2013/054312
§ 371 (c)(1),
(2) Date: Feb. 10, 2015

(87) PCT Pub. No.: WO2014/026098
PCT Pub. Date: Feb. 13, 2014

(65) Prior Publication Data
US 2015/0285387 A1    Oct. 8, 2015

Related U.S. Application Data

(60) Provisional application No. 61/841,491, filed on Jul. 1, 2013, provisional application No. 61/681,881, filed on Aug. 10, 2012.

(51) Int. Cl.
*B01D 21/30* (2006.01)
*F16K 15/14* (2006.01)
(Continued)

(52) U.S. Cl.
CPC ........ *F16K 15/14* (2013.01); *B01L 3/502723* (2013.01); *B01L 3/502738* (2013.01);
(Continued)

(58) Field of Classification Search
None
See application file for complete search history.

(56) References Cited

U.S. PATENT DOCUMENTS 5,076,943 A    12/1991    Rakow
5,186,431 A    2/1993    Tamari
(Continued)

FOREIGN PATENT DOCUMENTS

WO    WO 2004/087283 A1    10/2004
WO    WO 2005/028066 A1    3/2005
(Continued)

OTHER PUBLICATIONS

Chinese Office Action and English Translation Thereof, CN 201380052565.8, dated Nov. 24, 2015.
(Continued)

*Primary Examiner* — Richard Gurtowski
(74) *Attorney, Agent, or Firm* — Wolf, Greenfield & Sacks, P.C.

(57) ABSTRACT

Pressure control in fluidic systems is generally described. In some cases, a system comprises a fluid-permeable (e.g., liquid-permeable) medium and a pressure regulator. The medium and the pressure regulator can be positioned between a first fluidic channel and a second fluidic channel. The medium is arranged, in certain cases, such that fluid (e.g., liquid) can be transported from the first fluidic channel, through the medium, and into the second fluidic channel. In certain cases, when a first pressure within the first fluidic channel is below a sum of the permeability pressure differential of the medium with respect to the fluid and a second
(Continued)

pressure within the second fluidic channel, the fluid is substantially prevented from being transported through an outlet of the first fluidic channel.

25 Claims, 11 Drawing Sheets

(51) Int. Cl.
*F16K 99/00* (2006.01)
*B01L 3/00* (2006.01)

(52) U.S. Cl.
CPC ...... *F16K 99/0015* (2013.01); *F16K 99/0057* (2013.01); *B01L 2200/0673* (2013.01); *B01L 2200/0684* (2013.01); *B01L 2300/0681* (2013.01); *B01L 2300/0864* (2013.01); *B01L 2300/0874* (2013.01); *B01L 2400/0487* (2013.01); *B01L 2400/0655* (2013.01); *Y10T 137/7793* (2015.04); *Y10T 137/87249* (2015.04)

(56) References Cited

U.S. PATENT DOCUMENTS

| | | | |
|---|---|---|---|
| 5,932,100 | A | 8/1999 | Yager et al. |
| 5,942,443 | A | 8/1999 | Parce et al. |
| 6,187,196 | B1 | 2/2001 | Way et al. |
| 6,274,089 | B1 | 8/2001 | Chow et al. |
| 6,309,550 | B1 | 10/2001 | Brummerstedt et al. |
| 6,454,945 | B1 | 9/2002 | Weigl et al. |
| 6,666,909 | B1 | 12/2003 | Tegrotenhuis et al. |
| 6,808,929 | B1 | 10/2004 | Law et al. |
| 6,949,176 | B2 | 9/2005 | Vacca et al. |
| 8,075,778 | B2 | 12/2011 | Guenther et al. |
| 2001/0036626 | A1 | 11/2001 | Farinas et al. |
| 2003/0145886 | A1 | 8/2003 | Paul et al. |
| 2005/0066812 | A1 | 3/2005 | Vesper et al. |
| 2005/0068377 | A1* | 3/2005 | Ishikawa ............ B41J 2/14233 347/68 |
| 2006/0008913 | A1 | 1/2006 | Angelescu et al. |
| 2007/0144967 | A1 | 6/2007 | Guenther et al. |
| 2008/0249510 | A1 | 10/2008 | Mescher et al. |
| 2009/0183871 | A1 | 7/2009 | Salamitou et al. |
| 2009/0282978 | A1 | 11/2009 | Jensen et al. |
| 2010/0184202 | A1 | 7/2010 | McBride et al. |
| 2012/0103903 | A1 | 5/2012 | Hill et al. |

FOREIGN PATENT DOCUMENTS

| WO | WO 2007/006033 A2 | 1/2007 |
|---|---|---|
| WO | WO 2010/106426 A1 | 9/2010 |

OTHER PUBLICATIONS

Chinese Office Action for Application No. 201380052565.8 dated Nov. 24, 2015.
Aota et al, Countercurrent Laminar Microflow for Highly Efficient Solvent Extraction. Angew. Chem. Int. Ed. Jan. 29, 2007. 46 (6): 878-80. DOI: 10.1002/anie.200600122.
Aota et al, Parallel multiphase microflows: fundamental physics, stabilization methods and applications. Lab Chip. Sep. 7, 2009. 9(17): 2470-6. doi: 10.1039/b904430m. Epub Jun. 5, 2009.
Aota et al., Phase separation of gas-liquid and liquid-liquid microflows in microchips. Microchim. Acta. Mar. 2009. 164(3): 249-55. E Pub Nov. 11, 2008.
Battilocchio et al., Scale-Up of Flow-Assisted Synthesis of C2-Symmetric Chiral PyBox Ligands. Synthesis. Jan. 25, 2012. 44: 635-47. DOI: 10.1055/s-0031-1289676.
Bogdan et al., The Continuous-Flow Synthesis of Ibuprofen. Angew. Chem. Int. Ed. Oct. 26, 2009. 48(45): 8547-50. DOI: 10.1002/anie.200903055.
Burns et al, The intensification of rapid reactions in multiphase systems using slug flow in capillaries. Lab Chip. 2001. 1 (1): 10-15. DOI: 10.1039/B102818A.
Cervera-Padrell et al, Continuous Hydrolysis and Liquid-Liquid Phase Separation of an Active Pharmaceutical Ingredient Intermediate Using a Miniscale Hydrophobic Membrane Separator. Org. Process Res. Dev. 2012. 16(5): 888-900. DOI: 10.1021/op200242s.
Cervera-Padrell et al., Monitoring and Control of a Continuous Grignard Reaction for the Synthesis of an Active Pharmaceutical Ingredient Intermediate Using Inline NIR spectroscopy. Org. Process Res. Dev. 2012. 16(5): 901-914. DOI: 10.1021/op2002563.
Günther et al, Multiphase microfluidics: from flow characteristics to chemical and materials synthesis. Lab Chip 2006. 6(12): 1487-1503. DOI: 10.1039/B609851G.
Günther et al, Micromixing of Miscible Liquids in Segmented Gas-Liquid Flow. Langmuir. 2005. 21: 1547-55.
Hartman et al., Deciding Whether to Go with the Flow: Evaluating the Merits of Flow Reactors for Synthesis. Angew. Chem. Int. Ed. Aug. 8, 2011. 50(33): 7502-19. DOI: 10.1002/anie.201004637.
Hartman et al., Multistep Microchemical Synthesis Enabled by Microfluidic Distillation. Angew. Chem. Int. Ed. Jan. 25, 2010. 49 (5): 899-903. DOI: 10.1002/anie.200904634.
Hessel et al., Industrial Microreactor Process Development up to Production. In Microreactors in Organic Synthesis and Catalysis, Wiley-VCH Verlag GmbH & Co. KGaA. 2008. 211-275.
Hu et al, Continuous Multiple Liquid-Liquid Separation: Diazotization of Amino Acids in Flow. Org. Lett. 2012. 14(16): 4246-4249.
Jensen, Microreaction engineering—is small better? Chem. Eng. Sci. 2001. 56(2): 293-303.
Kockmann et al., Enabling Continuous-Flow Chemistry in Microstructured Devices for Pharmaceutical and Fine-Chemical Production. Chem. Eur. J. Aug. 28, 2008. 14 (25): 7470-7. DOI: 10.1002/chem.200800707.
Kockmann et al., Scale-up concept of single-channel microreactors from process development to industrial production. Chem. Eng. J. Mar. 1, 2011. 167 (2-3):718-26. DOI:10.1016/j.cej.2010.08.089.
Kuhn et al., A pH-Sensitive Laser-Induced Fluorescence Technique to Monitor Mass Transfer in Multiphase Flows in Microfluidic Devices. Ind. Eng. Chem. Res. 2012. 51 (26). 8999-9006.
McMullen et al., Rapid Determination of Reaction Kinetics with an Automated Microfluidic System. Org. Process Res. Dev. 2011. 15 (2): 398-407.
O'Brien et al., A prototype continuous-flow liquid-liquid extraction system using open-source technology. Org. Biomol. Chem. 2012. 10(35): 7031-6.
Pennemann et al., Benchmarking of Microreactor Applications. Org. Process Res. Dev. 2004. 8 (3). 422-39.
Sahoo et al., Multistep Continuous-Flow Microchemical Synthesis Involving Multiple Reactions and Separations. Angew. Chem. Int. Ed. Jul. 23, 2007. 46 (30): 5704-5708. DOI: 10.1002/anie.200701434.
Schuur et al., Scalable Enantioseparation of Amino Acid Derivatives Using Continuous Liquid-Liquid Extraction in a Cascade of Centrifugal Contactor Separators. Org. Process Res. Dev. 2009. 13(5): 911-4. DOI: 10.1021/op900152e.
Smith et al., A fully automated, multistep flow synthesis of 5-amino-4-cyano-1,2,3-triazoles. Org. Biomol. Chem. 2011. 9(6): 1938-47. DOI: 10.1039/C0OB00815J.
Townsend et al., Fluid modelling of microfluidic separator channels. Sensors and Actuators B. 2005. 111-112: 455-462.
Tzschucke et al., Modern Separation Techniques for the Efficient Workup in Organic Synthesis. Angew. Chem. Int. Ed. 2002. 41 (21): 3964-4000.
Varas et al, Copper(I)-Catalyzed Azide-Alkyne Cycloadditions in Microflow: Catalyst Activity, High-T Operation, and an Integrated Continuous Copper Scavenging Unit. Chem Sus Chem. 2012. 5 (9): 1703-7.
Webb et al. Continuous flow multi-step organic synthesis. Chem. Sci. 2010. 1(6): 675-80. DOI: 10.1039/C0SC00381F.
Wegner et al., Ten key issues in modern flow chemistry. Chem. Commun. 2011. 47 (16): 4583-92. DOI: 10.1039/C0CC05060A.
Wiles et al., Recent advances in micro reaction technology. Chem. Commun. 2011, 47, (23), 6512-35.

(56) References Cited

OTHER PUBLICATIONS

Zhu et al., A Low Temperature Co-Fired Ceramic Mesofluidic Separator. J of Physics: Conference Series. 2006. 34: 734-9.
International Search Report and Written Opinion dated Jan. 24, 2014 for Application No. PCT/US2013/054312.
International Preliminary Report on Patentability dated Feb. 19, 2015 for Application No. PCT/US2013/054312.
Extended European Search Report for Application No. 13827576.3 dated Mar. 9, 2016.
Hwang et al., Elastomeric membrane valves in a disc. Lab Chip. Apr. 21, 2011;11(8):1434-6. doi: 10.1039/c01c00658k. Epub Mar. 4, 2011.
Angell et al., Silicon Micromechanical Devices. Scientific American. Apr. 1983;248(4):44-55.
International Preliminary Report on Patentability, PCT/US2013/054312, dated Feb. 19, 2015.
International Search Report and Written Opinion, PCT/US2013/054312, dated Jan. 24, 2014.
European Office Action dated May 18, 2017 for Application No. EP 13827576.3.

\* cited by examiner

PRESSURE CONTROL IN FLUIDIC SYSTEMS

RELATED APPLICATIONS

This application is a U.S. National Stage application based on International Application No. PCT/US2013/054312, filed Aug. 9, 2013, and entitled "Pressure Control in Fluidic Systems,"which claims priority under 35 U.S.C. § 119(e) to U.S. Provisional Patent Application Ser. No. 61/681,881, filed Aug. 10, 2012 and entitled "Self-Tuning Liquid-Liquid Separator," and U.S. Provisional Patent Application Ser. No. 61/841,491, filed Jul. 1, 2013 and entitled "Pressure Control in Fluidic Systems," each of which is incorporated herein by reference in its entirety for all purposes.

GOVERNMENT SPONSORSHIP

This invention was made with government support under Grant No. N66001-11-C-4147 awarded by the Space and Naval Warfare Systems Center. The government has certain rights in this invention.

TECHNICAL FIELD

Pressure control in fluidic systems is generally described.

BACKGROUND

New trends in chemical synthesis involve the use of continuous reaction schemes, for example, in microfluidic and/or millifluidic devices. In many of these processes, it is often helpful to maintain controlled separation between two liquid phases and/or between a liquid phase and a gas phase. For example, in many processes, liquid-liquid and/or a gas-liquid separations are performed (e.g., between an aqueous and an organic phase). In some processes, such as certain membrane reactor systems, separation between two reactant phases and/or between a reactant phase and a product phase is desired. Improved systems and methods for establishing and/or maintaining separation between two fluids would be desirable.

SUMMARY

Pressure control in fluidic systems is generally described. In certain embodiments, the pressure control can be employed to reduce the difficulty of performing a separation of two fluids. The subject matter of the present invention involves, in some cases, interrelated products, alternative solutions to a particular problem, and/or a plurality of different uses of one or more systems and/or articles.

In one aspect, a system is provided. The system can be configured to at least partially separate a first fluid from a second fluid, in certain embodiments.

In some embodiments, the system comprises a first fluidic channel; a second fluidic channel; a fluid-permeable medium positioned between the first fluidic channel and the second fluidic channel such that the fluid-permeable medium forms at least a portion of a wall of the first fluidic channel and at least a portion of a wall of the second fluidic channel; and a pressure regulator comprising a moveable surface positioned between the first fluidic channel and the second fluidic channel such that the moveable surface forms at least a portion of a wall of the first fluidic channel and at least a portion of a wall of the second fluidic channel.

In certain embodiments, the system comprises a first fluidic channel comprising an outlet; a second fluidic channel comprising an outlet; a fluid-permeable medium positioned between the first fluidic channel and the second fluidic channel, the fluid-permeable medium having a permeability pressure differential with respect to a fluid; and a pressure regulator fluidically connected to the first fluidic channel and configured such that, when a first pressure within the first fluidic channel is below a sum of the permeability pressure differential of the fluid-permeable medium with respect to the fluid and a second pressure within the second fluidic channel, the fluid is substantially prevented from being transported through the outlet of the first fluidic channel.

The system comprises, in some embodiments, a first fluidic channel comprising a first fluid and a second fluid; a second fluidic channel; a fluid-permeable medium positioned between the first fluidic channel and the second fluidic channel such that the second fluid may be transported between the first and second fluidic channels via the fluid-permeable medium, wherein the fluid-permeable medium has a permeability pressure differential with respect to the second fluid; and a pressure regulator comprising a moveable surface, the moveable surface fluidically connected to and positioned between the first fluidic channel and the second fluidic channel, wherein the pressure regulator is configured such that, when a first pressure present within the first fluidic channel is below a sum of the permeability pressure differential of the fluid-permeable medium with respect to the second fluid and a second pressure within the second fluidic channel, the first and second fluids are substantially prevented from being transported through the first fluidic channel.

The system comprises, in certain embodiments, a first fluidic channel; a second fluidic channel; a fluid-permeable medium between the first fluidic channel and the second fluidic channel configured such that a fluid may be transported between the first and second fluidic channels via the fluid-permeable medium; and a pressure regulator fluidically connected to the first fluidic channel and the second fluidic channel and configured such that when the fluid is transported from the first fluidic channel to the second fluidic channel through the fluid-permeable medium and a flow rate of the fluid within the first fluidic channel is altered by at least about 5%, the pressure drop across the fluid-permeable medium is not substantially changed.

In some embodiments, the system comprises a first fluidic channel; a second fluidic channel; a fluid-permeable medium between the first fluidic channel and the second fluidic channel configured such that, in use, a first fluid is inhibited from transport across the fluid-permeable medium from the first fluidic channel to the second fluidic channel, and a second fluid is transported across the fluid-permeable medium from the first fluidic channel to the second fluidic channel, and a pressure regulator fluidically connected to the first fluidic channel and configured to inhibit fluid flow in the first fluidic channel below a threshold pressure, and to allow fluid flow in the first fluidic channel at or above the threshold pressure, wherein the threshold pressure is sufficient to allow flow of substantially all of the second fluid from the first fluidic channel to the second fluidic channel across the fluid-permeable medium.

In one aspect, a pressure regulator is described. In some embodiments, the pressure regulator comprises a flexible diaphragm positioned between a first fluidic channel and a second fluidic channel, wherein the diaphragm is configured such that: when a pressure differential across the flexible diaphragm is substantially zero, the flexible diaphragm is in a first non-zero state of stress and is in contact with a wall of the first fluidic channel over a first surface portion of the diaphragm, and when a pressure differential across the flexible diaphragm is greater than a threshold value, the flexible diaphragm is not in contact with the wall of the first fluidic channel or is in contact with the wall of the first fluidic channel over a second surface portion of the diaphragm that is smaller than the first surface portion of the diaphragm. In some such embodiments, the threshold value can be set to a value that is greater than or equal to a permeability pressure differential of a fluid permeable membrane with respect to at least one fluid that is to be separated (e.g., at a flow rate at which the system is configured to be operated).

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
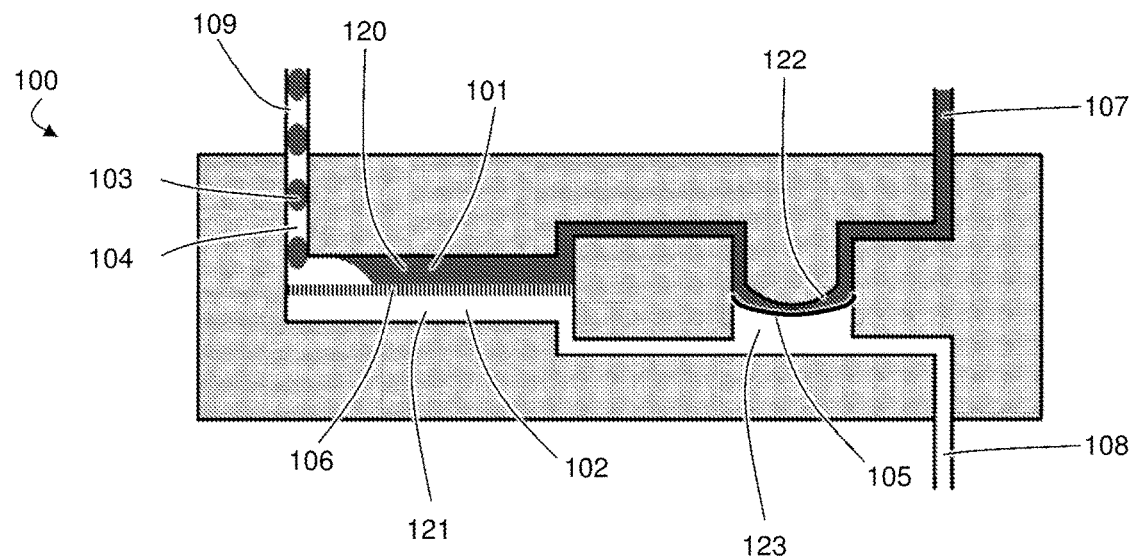
FIG. 1A is a fluidic system, according to certain embodiments.

Pressure control in fluidic systems is generally described. Certain embodiments relate to fluidic systems used to separate a first fluid from a second fluid (and/or, in some embodiments, additional fluids). In some embodiments, the fluidic system comprises a pressure regulator to control the pressure in one or more fluidic channels. The pressure regulator can be configured such that when the pressure applied to the fluid mixture creates a pressure differential (or gradient) across the pressure regulator that is below a threshold level, fluid is restricted from being transported through at least one outlet of the system. In some such embodiments, when the pressure gradient across the regulator is above the threshold level, fluid is transported through the outlet through which fluid flow was previously constrained, and substantially all of at least one of the fluids is transported through a fluid-permeable medium and separated from at least a portion of the other fluid(s) in the mixture. In some embodiments, the threshold pressure level can be set to a value that is equal to or greater than the permeability pressure differential of the fluid-permeable medium with respect to the fluid that is to be transported through the fluid-permeable medium, as described in detail elsewhere.

In some such embodiments, when the pressure applied to the fluid mixture is below the capillary pressure of the fluid mixture with respect to the passageways within the fluid-permeable medium, substantially complete separation of at least one component of the mixture from other component(s) of the mixture can be achieved. In this way, according to certain embodiments, the pressure regulator can ensure that, as long as fluid is being transported through the system outlets at a pressure below the capillary pressure of the fluid mixture with respect to the fluid-permeable medium, substantially complete separation of at least one fluid from the other fluid(s) will be achieved. In some such embodiments, the pressure regulator is configured to passively control pressure in the one or more fluidic channels within the fluidic system to achieve any of the above performance characteristics.

Many fluidic systems in which a fluid-permeable medium is used to separate a fluidic mixture require the pressure within the system to be controlled in order to operate properly and/or achieve desired results. Such fluidic separation systems often utilize components having small length scales (e.g., millimeter-sized length scales, micron-sized length scales, or smaller), such as separation membranes. In many such systems, separation is generally dictated by surface forces that cannot be overcome by gravitational forces as in traditional separation systems. Rather, interfacial tension, $\gamma$, between the fluids to be separated is often relied upon to provide the necessary force for separation. For example, in the case of certain membrane-based separators, separation can be achieved by relying on the surface tension forces between the membrane, the first fluid in a mixture, and the second fluid in the mixture, as described, for example, in U.S. Patent Publication No. 2007/0144967 to Guenther et al. entitled "Fluid Separation" and U.S. Patent Publication No. 2009/0282978 to Jensen et al. entitled "Microfluidic Separators for Multiphase Fluid-Flow Based On Membranes", each of which is incorporated herein by reference in its entirety for all purposes. However, to utilize interfacial tension to achieve substantially complete separation of a fluid mixture, pressures within the fluidic separation system must often be precisely controlled, for example, to prevent both fluids from being transported through the membrane and/or to ensure that all of at least one fluid within the fluid mixture is completely transported through the membrane.

Previous fluidic separation systems have utilized pressure controllers at each individual outlet (e.g., a first outlet for a first fluid in the original mixture, a second outlet for a second fluid in the original mixture, etc.) to independently control the pressure within each fluidic outlet channel connected to the separation device. The use of pressure controllers at each outlet can ensure operation at pressures that are compatible with separation using interfacial tension. Though such previous fluidic separation systems can achieve acceptable separation performance, the integration of such systems within other components (including other components within certain larger fluidic systems) is generally difficult due to fluctuations in pressure downstream of the separation system, which can easily disrupt separation. To achieve proper separation in the presence of downstream fluctuations in pressure, these separation systems typically utilize additional equipment that increases the volume and complexity of the system and/or design for very specific operating conditions at the cost of the flexibility and robustness of the system.

A pressure regulator has been discovered, within the context of certain embodiments of the present invention, that can decouple pressures within a device used to separate fluids within a mixture from the pressures within other downstream components to which the separation device is fluidically connected. By decoupling the pressures within the separation device from the pressures within the downstream components, in certain embodiments, the system can be configured such that downstream fluctuations in pressure do not substantially affect pressures within the separation device, thereby enhancing performance of the separation device. Such a pressure regulator of the present invention may be used in various applications, including fluidic separation systems, membrane reactors, distillation systems, and the like.

It has also been discovered, within the context of certain embodiments of the present invention, that substantially complete separation of a fluid mixture can be achieved in fluidic separation systems that utilize a fluid-permeable medium when the pressure across the fluid-permeable medium is greater than a permeability pressure differential but less than the capillary pressure. In some such fluidic separation systems, the pressure regulator is configured such that fluid flow out of at least one outlet in the system is inhibited (and, in certain instances, prevented) when the pressure across the fluid-permeable medium is less than a threshold level that is equal to or greater than the permeability pressure differential of the fluid-permeable medium with respect to the fluid that is to be transported through the fluid-permeable medium. Thus, as will be discussed in more detail below, the pressure regulator can be configured to ensure that the pressure differential across the fluid-permeable medium during operation of the device is greater than the pressure differential across the fluid-permeable medium that is required to achieve substantially complete separation of a first fluid from a second fluid.

A non-limiting example of a system comprising a pressure regulator is shown in FIG. 1A. In FIG. 1A, system 100 comprises a first fluidic channel 101. System 100 further comprises a second fluidic channel 102. System 100 further comprises inlet 109. The first and/or second fluidic channels may contain fluids, in some embodiments. For example, in certain embodiments, first fluidic channel 101 comprises a mixture comprising first fluid 103 and second fluid 104. For example, the mixture within fluidic channel 101 can be a mixture of a first fluid and a second fluid that is immiscible with the first fluid. In certain embodiments, the device can include a first outlet and a second outlet. For example, referring to FIG. 1A, device 100 comprises first outlet 107 and second outlet 108. As illustrated in FIG. 1A, inlet 109 of system 100 corresponds to the inlet of first fluidic channel 101, outlet 107 of system 100 corresponds to the outlet of first fluidic channel 101, and outlet 108 of system 100 corresponds to the outlet of second fluidic channel 102.

In some embodiments, system 100 is configured such that at least one of the fluids in the mixture within channel 101 is separated from the remaining fluid(s) in the fluid mixture within channel 101. In some such embodiments, one of the separated fluids is transported out of the system by a first outlet while a second of the separated fluids is transported out of the system by a second outlet. For example, referring to FIG. 1A, fluid 103 can be transported out of system 100 via outlet 107 while second fluid 104 can be transported out of system 100 via outlet 108. In other embodiments, third, fourth, fifth, or additional fluids may be present within the fluid mixture within channel 101, and system 100 can be configured to separate any one or more fluids (and, in some embodiments, subsequently transport them out of outlet 107) from any one or more other fluids (and, in certain embodiments, subsequently transport them out of outlet 108).

It should be understood that FIG. 1A is a schematic representation of a non-limiting embodiment of the system according to certain embodiments and that the scope of the present invention is in not limited by the configuration and/or design of components (i.e., fluidic channels, fluids, fluid-permeable medium, pressure regulator, etc.) in FIG. 1A.

In some embodiments, a fluid permeable medium can be positioned between the first fluidic channel and the second fluidic channel. For example, referring to FIG. 1A, system 100 can also comprise fluid-permeable medium 106 positioned between first fluidic channel 101 and second fluidic channel 102. In certain embodiments, the fluid-permeable medium forms at least a portion of a wall of the first fluidic channel. For example, in FIG. 1A, fluid permeable medium 106 forms a portion of a wall of first fluidic channel 101. The fluid-permeable medium can, in certain embodiments, form a portion of a wall of the second fluidic channel. For example, in FIG. 1A, fluid permeable medium 106 also forms a portion of a wall of second fluidic channel 102.

The fluid-permeable medium can be used to separate at least one fluid within a mixture of fluids from other fluid(s) within the mixture of fluids. For example, referring to FIG. 1A, fluid-permeable medium 106 can be used to at least partially separate first fluid 103 from second fluid 104. In certain embodiments, the system can be operated such that at least a portion of (e.g., at least about 80 vol %, at least 90 vol %, at least 95 vol %, at least 99 vol %, or substantially all of) a first fluid within the fluid mixture transported through the inlet of the system is retained by the fluid permeable medium and at least a portion of (e.g., at least about 80 vol %, at least 90 vol %, at least 95 vol %, at least 99 vol %, or substantially all of) a second fluid within the fluid mixture transported through the inlet of the system is transported through the fluid permeable medium. For example, as illustrated in FIG. 1A, substantially all of first fluid 103 that is transported through inlet 109 is retained by fluid-permeable medium 106 and transported out of system 100 via outlet 107. In addition, as illustrated in FIG. 1A, substantially all of second fluid 104 that is transported through inlet 109 is transported through fluid-permeable medium 106 and transported out of system 100 via outlet 108. In some embodiments, the system is configured to produce a first stream containing the first fluid in an amount of at least about 75 wt % (and/or, at least about 90 wt %, at least about 95 wt %, at least about 99 wt %, or substantially 100 wt %) and a second stream containing the second fluid in an amount of at least about 75 wt % (and/or, at least about 90 wt %, at least about 95 wt %, at least about 99 wt %, or substantially 100 wt %.

In some embodiments, a method of separating a first fluid from a second fluid may include pre-wetting with the second fluid a plurality of fluid passageways in the fluid-permeable medium positioned between the first and second fluidic channel, such that substantially all of the fluid passageways thereby contain a column of the second fluid along its length. A combined flow of a mixture of the first and second fluids in the first fluidic channel may be presented to the fluid-permeable medium, so that the plurality of channels is in fluid communication with the combined flow. Fluid pressure may be applied across the combined flow and the fluid-permeable medium. In some such embodiments, the applied pressure is selected such that it does not exceed the capillary pressure (described in more detail below) in the plurality of fluid passageways. In some instances in which the applied pressure exceeds the capillary pressure, the combined flow may be forced through the fluid-permeable medium, thus failing to achieve separation. In certain embodiments in which proper pressure levels are applied across the combined fluid and the fluid-permeable medium, the second fluid flows through the plurality of fluid passageways, and the first fluid is excluded from the plurality of fluid passageways, thereby separating at least a portion of the first fluid from the second fluid.

The fluid-permeable medium may have a permeability pressure differential with respect to a fluid (e.g., the first fluid within the mixture of fluids within the first fluidic channel, the second fluid within the mixture, etc.). The permeability pressure differential of a fluid-permeable medium with respect to a fluid refers to the minimum differential pressure (as measured from a first side of the fluid-permeable medium to a second side of the fluid-permeable medium) required to drive all of the fluid through the fluid-permeable medium from the first side of the fluid-permeable medium to the second side of the fluid-permeable medium, using the entire area of the fluid-permeable medium. In some embodiments, the permeability pressure differential with respect to a particular fluid can be approximated by the following equation, assuming that the fluid-permeable medium acts as an array of cylindrical pores:

$$\Delta P_{per} = \frac{8\mu QL}{n\pi R^4} \quad [1]$$

where μ is the viscosity of the fluid, Q is the volumetric flow rate of the fluid transported across the fluid-permeable medium, L is the thickness of the fluid-permeable medium, n is the number of fluid passageways within the fluid-permeable medium, and R is the radius of the fluid passageways within the fluid-permeable medium.

In embodiments in which the differential pressure across the fluid-permeable medium (e.g., at all flow rates at which the device is operated) is less than the permeability pressure differential with respect to all fluids within a fluid mixture, fluid flow across the fluid-permeable medium is inhibited (and, in certain cases, prevented). In some such cases, complete separation of a fluid mixture using the fluid-permeable medium cannot occur because none of the fluids within the fluid mixture can be completely transported across the fluid-permeable medium. Conversely, in embodiments in which the differential pressure across the fluid-permeable medium is greater than or equal to the permeability pressure differential with respect to at least one fluid, complete flow of the at least one fluid across the fluid-permeable medium can occur. In some such embodiments, as long as the differential pressure across the fluid-permeable medium is less than the capillary pressure associated with fluid passageways in the fluid-permeable medium (as described in more detail below), complete separation of the fluid mixture can occur.

In some embodiments, the system comprises a pressure regulator. For example, referring to FIG. 1A, system 100 comprises pressure regulator 105. Pressure regulator 105 can be configured such that fluid flow through the outlet of the first fluidic channel is inhibited (or, in certain cases, prevented) when the differential pressure between the first fluidic channel and the second fluidic channel is below a threshold differential pressure.

The pressure regulator may be fluidically connected to one or more of the fluidic channels with which the fluid-permeable medium is in contact. For example, in some embodiments, the pressure regulator is fluidically connected to the first fluidic channel (e.g., fluidic channel 101 in FIG. 1A). In some embodiments, the pressure regulator is fluidically connected to the second fluidic channel (e.g., fluidic channel 102 in FIG. 1A). In some instances, the pressure regulator is fluidically connected to both the first fluidic channel (e.g., channel 101 in FIG. 1A) and the second fluidic channel (e.g., channel 102 in FIG. 1A).

Fluidic connection of the pressure regulator to the first and/or second fluidic channels can allow the pressure regulator to be exposed to the same pressures (and pressure differential) to which the fluid-permeable medium is exposed. For example, in some embodiments, the pressure regulator is fluidically connected to the first fluidic channel such that a first side of the fluid-permeable medium is exposed to a first pressure (exerted by the fluid within the first channel) and the first side of the pressure regulator is exposed to the first pressure (again, exerted by the fluid within the first channel). Referring to FIG. 1A as one example, fluid-permeable medium 106 and pressure regulator 105 are both exposed to fluid within first fluidic channel 101. Accordingly, in certain embodiments, the fluid within fluidic channel 101 exerts substantially the same pressure on both fluid-permeable medium and pressure regulator 105 (assuming the pressure drop of the fluid along the length of the first channel between the fluid-permeable medium and the pressure regulator is negligible).

In some embodiments, the pressure regulator is fluidically connected to the second fluidic channel such that a second side of the fluid-permeable medium is exposed to a second pressure (exerted by the fluid within the second channel) and the second side of the pressure regulator is exposed to the second pressure (again, exerted by the fluid within the second channel). Referring to FIG. 1A as one example, fluid-permeable medium 106 and pressure regulator 105 are both exposed to fluid within second fluidic channel 102. Accordingly, in certain embodiments, the fluid within fluidic channel 102 exerts substantially the same pressure on both fluid-permeable medium 106 and pressure regulator 105 (assuming the pressure drop of the fluid along the length of the second channel between the fluid-permeable medium and the pressure regulator is negligible).

In some embodiments in which the pressure regulator is fluidically connected to both the first and second fluidic channels, the pressure differential across the fluid-permeable medium can be substantially the same as (e.g., within 5% of or within 1% of) the pressure differential across the pressure regulator. For example, referring to FIG. 1A, the pressure differential across fluid permeable medium 106 corresponds to the difference between the pressure of the fluid within region 120 of channel 101 (on one side of the fluid-permeable medium) and the pressure of the fluid within region 121 of channel 102 (on a second side of the fluid-permeable medium). Similarly, the pressure differential across pressure regulator 105 corresponds to the difference between the pressure of the fluid within region 122 of channel 101 (on one side of the pressure regulator) and the pressure of the fluid within region 123 of channel 102 (on the other side of the pressure regulator). In certain embodiments, if the pressure drop from region 120 to 122 and the pressure drop from region 121 to 123 are relatively small, the difference in pressure across fluid-permeable medium 106 and the difference in pressure across pressure regulator 105 can be substantially the same. In certain embodiments, and as described in more detail below, the pressure regulator can be configured such that flow of fluid out of the outlet of the first fluidic channel is inhibited when the pressure differential across the fluid-permeable medium is smaller than a threshold pressure differential that is greater than or equal to the permeability pressure differential of the fluid-permeable medium for that fluid during operation (e.g., during operation at the flow rates for which the system is designed to be operated). In some such embodiments, the pressure regulator can be configured such that flow of fluid out of the outlet of the first fluidic channel is allowed when the pressure differential across the fluid-permeable medium is greater than a threshold pressure differential that is greater than or equal to the permeability pressure differential of the fluid-permeable medium for that fluid during operation (e.g., during operation at the flow rates for which the system is designed to be operated). In some embodiments, the system can be designed to be operated such that the second fluid achieves a flow rate (e.g., including, in some cases, a maximum flow rate) through the fluid-permeable membrane, and the pressure regulator can be configured to operate as described in this paragraph (or elsewhere herein) when the second fluid is transported through the fluid-permeable membrane at that flow rate (e.g., at the maximum flow rate). In certain embodiments, the pressure regulator can be configured such that flow of fluid out of the outlet of the first fluidic channel is inhibited when the pressure differential across the fluid-permeable medium is smaller than a threshold pressure differential that is greater than or equal to the permeability pressure differential of the fluid-permeable medium for that fluid during operation at a total flow rate of fluid through the device of at or above about 1 microliter/min, at or above about 10 microliters/min, at or above about 100 microliters/min, at or above about 1 mL/min, at or above about 10 mL/min, at or above about 20 mL/min, at or above about 50 mL/min, at or above about 100 mL/min, at or above about 500 mL/min, or at or above about 1000 mL/min (and/or, in certain embodiments, up to about 10,000 mL/min, or more).

In some embodiments, the pressure regulator can be configured to passively control the pressure within one or more fluidic channels. That is to say, the pressure regulator can be configured to control the pressure within one or more fluidic channels during operation without active control from another component in the system, such as an active electronic signal-based controller. Examples of such pressure regulators include those comprising a moveable surface, described in more detail below.

Figure 1B:
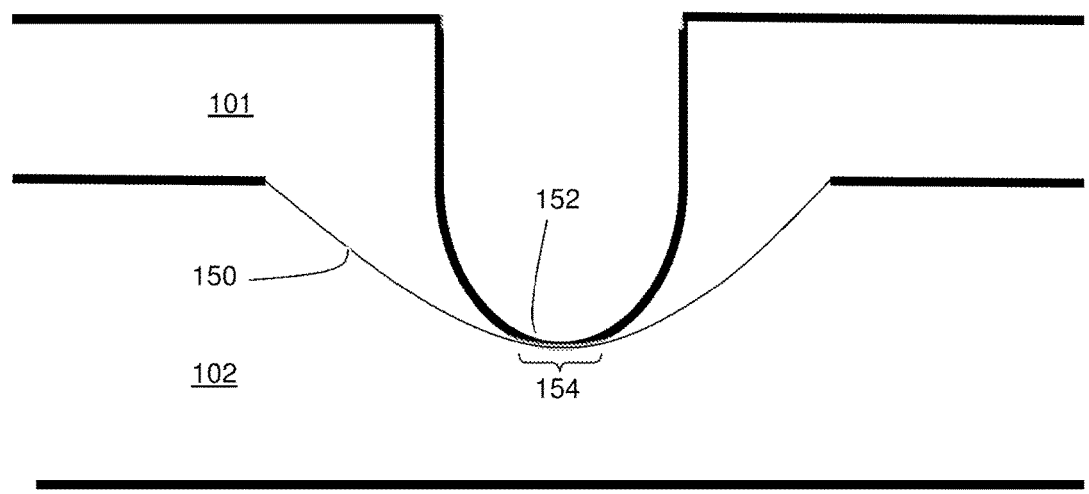
FIGS. 1B-1C are cross-sectional schematic diagrams illustrating the operation of a diaphragm-based pressure regulator, according to some embodiments.
Figure 1C:
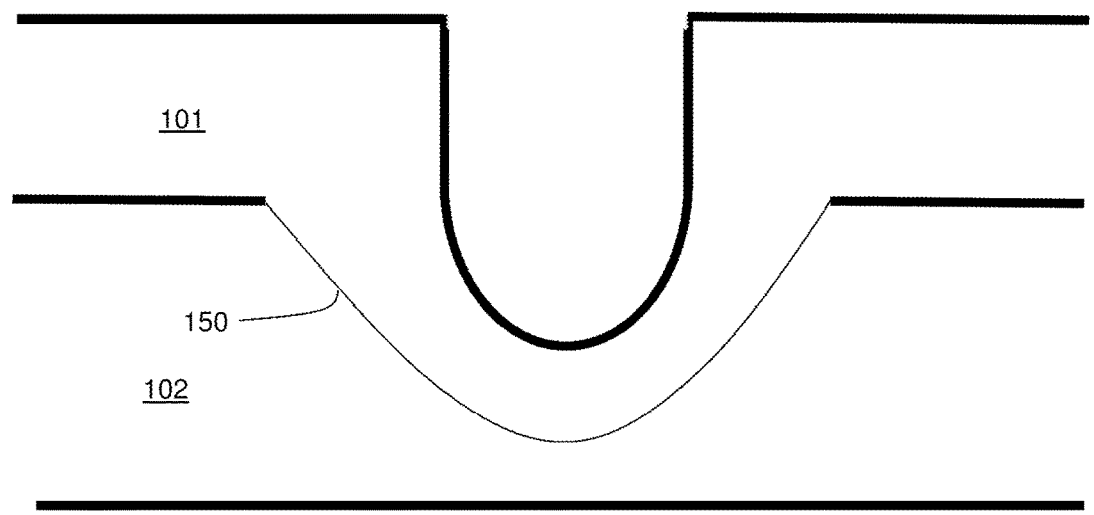

In some embodiments, the pressure regulator comprises a moveable surface. For example, in FIG. 1A, the pressure regulator comprises a diaphragm, which can move in response to a change in the pressure differential applied across the diaphragm. FIGS. 1B-1C are schematic illustrations showing the behavior of such pressure regulators. In FIG. 1C, the pressure regulator comprises flexible diaphragm 150 positioned between first fluidic channel 101 and second fluidic channel 102. Diaphragm 150 can be configured such that when a pressure differential across the flexible diaphragm is substantially zero (and/or less than zero, as might be observed when a backpressure is applied to outlet 108), as illustrated in FIG. 1B for example, the flexible diaphragm is in contact with a wall 152 of first fluidic channel 101 over a first surface portion 154 of the diaphragm. One of ordinary skill in the art would understand that the pressure differential across the flexible diaphragm corresponds to the difference between the pressure on one side of the diaphragm and the pressure on the other side of the diaphragm. For example, in FIG. 1B, the pressure differential across diaphragm 105 corresponds to the difference between the pressure of the fluid within region 122 of channel 101 (on one side of the diaphragm) and the pressure of the fluid within region 123 of channel 102 (on a second side of the diaphragm). In some such embodiments, when a pressure differential across the flexible diaphragm is substantially zero, as illustrated in FIG. 1B, the diaphragm can be in a first non-zero state of stress (e.g., in a first state of non-zero tensile stress).

In some embodiments, when a pressure differential across the elastic diaphragm is greater than a threshold value (which threshold value can be, in certain embodiments, selected such that it is at or above a permeability pressure differential of the fluid-permeable medium in the system in which the diaphragm is used), the flexible diaphragm is not in contact with the wall of the first fluidic channel or is in contact with the wall of the first fluidic channel over a second surface portion of the diaphragm that is smaller than the first surface portion of the diaphragm. For example, in FIG. 1C, the pressure within channel 101 is greater than the pressure within channel 102 to such a degree that diaphragm 150 is deformed such that it no longer contact wall 152 of channel 101. In some embodiments, when a pressure differential across the elastic diaphragm is greater than the threshold value, the diaphragm is in a second non-zero state of stress that is greater than (e.g., at least about 5% greater than, at least about 10% greater than, at least about 25% greater than, at least about 100% greater than and/or up to about 1000% greater than, or more) the first non-zero state of stress of the diaphragm when the pressure differential across the diaphragm is substantially zero (e.g., as illustrated in FIG. 1B). In some embodiments, when a pressure differential across the elastic diaphragm is greater than the threshold value, the diaphragm is in a second non-zero state of stress such that the strain on the diaphragm is at least about 0.001% greater, at least about 0.01% greater, at least about 0.1% greater, at least about 1% greater, at least about 5% greater, at least about 10% greater, at least about 25% grater, at least about 50% greater, or at least about 100% greater (and/or, in certain embodiments, up to about 200% greater, up to about 500% greater, up to about 1000% greater, or more) than the linear strain on the diaphragm in the first non-zero state of stress.

In some embodiments, diaphragm 150 can be elastic. In some such embodiments, the diaphragm comprises a polymer. Examples of materials from which diaphragms can be formed include, but are not limited to, perfluoroalkoxy (PFA), latex, polytetrafluoroethylene (PTFE), fluorinated ethylene propylene (FEP), fluoroeleastomers (FMK), perfluoro-elastomers (FFKM), tetrafluoro ethylene/propylene rubbers (FEPM), neoprene, nitrile rubber, polyethylene, metal (e.g., metal films), and the like.

Referring back to FIG. 1A, the default state of a moveable surface may be designed to partially or completely seal against the first fluidic channel, substantially restricting or inhibiting, respectively, the ability of fluid to flow out of the first channel. For example, as illustrated in FIG. 1A, the moveable surface may be substantially non-planar at rest (i.e., in the default state) such that the moveable surface constricts the first fluidic channel, restricting fluid flow out of the first fluidic channel. In some embodiments, the moveable surface is exposed to the fluid within the second fluidic channel, such that at least a portion of pressure within the second fluidic channel is translated to and exerted on the moveable surface in an opposing direction relative to the pressure exerted by the fluid within the first fluidic channel. In some instances, substantially all the pressure within the second fluidic channel is exerted on the moveable surface.

In some embodiments, the moveable surface is fluidically connected to a first fluidic channel and associated with a second fluidic channel, such that a portion or substantially all of the pressures within the first and second fluidic channels are exerted on the moveable surface. In some such cases, the moveable surface is also configured to partially or completely seal against the first fluidic channel. Without wishing to be bound by theory, it is believed that when at least a portion of the pressures within the first and second fluidic channels are exerted on the moveable surface in opposing directions and the moveable surface is configured to at least partially seal against the first fluidic channel, fluid is substantially prevented from being transported out of the first fluidic channel (e.g., via outlet 107 in FIG. 1A) unless the pressure ($P_1$) in the first fluidic channel is greater than or equal to the sum of the pressure ($P_2$) exerted on the moveable surface by the second fluidic channel and the deformation pressure ($P_D$) required to deform the moveable surface and at least partially (e.g., completely) unsealing the first fluidic channel. It is believed that fluid is allowed to flow out of the first fluidic channel when the following relationship is satisfied: $P_1 \geq P_2 + P_D$. Thus, $P_2 + P_D$ can represent a threshold pressure in the first fluidic channel and $P_D$ is the threshold differential pressure between the first and second fluidic channels required to allow fluid to flow in the first fluidic channel.

In some embodiments, the $P_D$ is determined in part by certain properties (e.g., material, thickness, shape, elasticity) of the moveable surface. In certain embodiments, one or more property of the moveable surface is selected to achieve a desired deformation pressure. For instance, the degree of elastic deformation of the moveable surface in its default state is selected to provide a certain deformation pressure. In some instances, properties of other components of the pressure regulator may contribute to the deformation pressure. As one example, the pressure regulator may comprise a moveable surface connected to a spring. In some such cases, the pressure required to deform the moveable surface is determined by the stiffness of the spring. In another example, the moveable surface is part of a deformable diaphragm, such as the diaphragm-based pressure regulator described above with respect to FIGS. 1B-1C. The diaphragm may be elastic and have a modulus of elasticity that dictates the deformation pressure. In some embodiments, the pressure regulator or a component of the pressure regulator (e.g., diaphragm, moveable surface, spring) has a modulus of elasticity of at least about 0.01 GPa or at least about 0.1 GPa (and/or, in certain embodiments, up to about 1 GPa, up to about 200 GPa, or greater).

In general, the deformation pressure may be selected as desired based by controlling one or more property associated with the moveable surface, a component of the pressure regulator, and/or the design the pressure regulator. For example the deformation pressure may be greater than or equal to about 0.001 pounds per square inch (psi), greater than or equal to about 0.01 psi, greater than or equal to about 0.1 psi, greater than or equal to about 0.5 psi, greater than or equal to about 1 psi, or greater than or equal to about 10 psi (and/or, in certain embodiments, up to about 30 psi, up to about 40 psi, or greater). In some embodiments, the deformation pressure may be selected based on the design of the separator system. For example, the deformation pressure may be selected, in certain embodiments, based upon the types of fluids (including phase and/or chemical composition) of the fluids that are to be separated. In certain embodiments, the deformation pressure will be less than the interfacial tension of the system. For example, in certain gas-liquid separation systems, suitable deformation pressures could be between 15 psi and 40 psi, in some instances. In certain liquid-liquid separator systems, the deformation pressure could be between about 0.5 psi and about 30 psi, in some embodiments.

In some embodiments, the deformation pressure ($P_D$) is selected based on a particular application of the system. In embodiments in which a system comprises a fluid-permeable medium for fluid separation, the deformation pressure may be selected based on certain properties of the fluids to be separated and/or the fluid-permeable medium (e.g., degree of wetting between one or more fluid and the fluid-permeable medium). For instance, the deformation pressure may be selected to be equal to or greater than the permeability pressure differential of the fluid-permeable medium with respect to a fluid (e.g., the permeate fluid). In some such cases, the pressure regulator fluidically connected to a first fluidic channel is configured such that, when a first pressure within the first fluidic channel is below the sum of the permeability pressure differential of the fluid-permeable medium with respect to the fluid and a second pressure within the second fluidic channel, the fluid is substantially prevented from being transported out of the first fluidic channel. In general, the deformation pressure may be selected such that the pressure regulator fluidically connected to the first fluidic channel is configured to inhibit fluid flow out of the first fluidic channel below a threshold differential pressure, and to allow fluid flow out of the first fluidic channel at or above the threshold differential pressure, wherein the threshold pressure is sufficient to achieve a desired result (e.g., allow flow of substantially all of the second fluid from the first fluidic channel to the second fluidic channel across the fluid-permeable medium).

In some embodiments, the pressure regulator is configured to maintain a substantially constant deformation pressure ($P_D$) over a wide range of applied pressures. Thus, unlike many previous systems, certain of the pressure regulators described herein can allow pressure to be controlled over a wide range of flow rates. Without wishing to be bound by any particular theory, it is believed that, in certain instances, pressure regulation is accurate across flow rates as the pressure drop the first fluid experiences when traveling through the regulator is negligible with respect to the deformation pressure; it is believed that, in certain instances, this is also a result of the fact that a small deformation of the diaphragm results is a large area available for the first fluid to flow. In some instances, the pressure regulator is configured such that when a fluid is transported from a first fluidic channel to a second fluidic channel through a fluid-permeable medium and a flow rate of the fluid within the first fluidic channel is altered by at least about 5%, at least about 25%, at least about 50%, or at least about 100% (and/or, in certain embodiments, by up to 1000% or more), the pressure drop across the fluid-permeable medium is not substantially changed (e.g., it varies by less than about 15%, less than about 10%, less than about 5%, less than about 2%, or less than about 1%).

As described elsewhere, a fluid-permeable medium can be used to perform separation in certain embodiments. In some embodiments, the fluid-permeable medium comprises a plurality of fluid passageways that allow fluid to traverse the fluid-permeable medium. In some instances, the fluid passageways may be openings, such as pores or an array of microfabricated channels in a solid or semi-solid structure. In one example, the fluid-permeable medium may comprise a solid matrix comprising an array of microfabricated channels forming a plurality of substantially straight passageways. In certain embodiments, the fluid-permeable medium may comprise a material which can function as a selective barrier between two or more fluids, such as a membrane. The membrane may comprise a plurality of fluid passageways (e.g., pores) that allow fluid to traverse the pores and may have certain other properties that enhance the selectivity of the membrane toward a particular fluid. In other embodiments, the fluid-permeable medium comprises a single fluid passageway. In general, any fluid-permeable medium that contains one or more permeable passageway may be used.

The fluid-permeable medium may be made of any suitable material including, but not limited to, polymers, ceramics, metals, semiconductors, and the like. In certain embodiments, the fluid-permeable medium comprises a membrane such as, for example, a polytetrafluoroethylene (PTFE) membrane, polyvinylidene fluoride (PVDF), cellulose acetate, polysulfane, polyether sulfone, polypropylene, polyethylene, polyvinyl chloride, and the like.

In general, the fluid-permeable medium has a capillary pressure associated with the fluid passageway(s) in the fluid-permeable medium and the fluid mixture to which the fluid-permeable medium is exposed. The capillary pressure ($P_{cap}$) can be quantified as follows:

$$P_{cap} = \frac{2\gamma\cos(\theta)}{r} \quad [2]$$

where $\theta$ is the contact angle formed between the solid material of the fluid permeable medium, the first fluid that is to be separated, and the second fluid to be separated; r is the radius of curvature of an interface formed between the first fluid that is to be separated and the second fluid that is to be separated at the inlet of the passageways within the fluid-permeable medium; and gamma ($\gamma$) is the interfacial tension with respect to the first fluid to be separated and the second fluid to be separated. In some embodiments, the capillary pressure is the maximum differential pressure for substantially complete separation of a fluid mixture, such that substantially complete separation of a fluid mixture cannot occur at or above the capillary pressure but can occur below the capillary pressure. Not wishing to be bound by any particular theory, it is believed that, above the capillary pressure, both the first and second fluids are forced through the fluid-permeable medium, thereby preventing their separation.

In some embodiments, the fluid-permeable medium is configured to enhance the separation of fluids. In one set of embodiments, the fluid permeable medium is pre-wetted by a fluid or certain fluids in a mixture (e.g., the permeate fluid or fluids), prior to performing the separation step. In certain embodiments, pre-wetting the fluid-permeable medium causes each fluid passageway in the fluid-permeable medium to contain a column of the fluid(s) along its length. In some such embodiments, the presence of a column of a fluid(s) in the fluid passageway(s) of the fluid-permeable medium lowers the differential pressure of the fluid(s) required for traversing the fluid permeable medium relative to another fluid (e.g. in a mixture) that is not present in the fluid passageway. In some embodiments, the fluid-permeable medium can be configured (e.g., via an appropriate selection of materials from which the fluid-permeable medium is made) such that the fluid-permeable medium preferentially wets the fluid and/or fluids that are to be transported through the fluid-permeable medium (also referred to herein as the permeate fluid), relative to the fluid that is to be retained by the fluid-permeable medium (also referred to herein as the retentate fluid). In some instances, the fluid permeable medium may not be substantially wetted by the retentate fluid. In certain embodiments, certain properties of the fluid-permeable medium, such as permeability, tortuosity of pores, material of construction, dimensions, etc. may be selected based on the fluids to be separated. For example, a hydrophobic fluid-permeable medium may be used in separations in which a hydrophobic fluid is transported through the fluid-permeable medium while a hydrophilic fluid is retained by the fluid-permeable medium.

In general, systems, described herein, may be used with any suitable fluid type, combination of fluids, and/or number of fluids. For example, the first fluidic channel may contain a first fluid and a second fluid. In some such cases, the first fluidic channel contains slugs, bubbles, or other isolated portions of one fluid contained within a second fluid (e.g., a continuous phase of a second fluid). In some cases, the first fluid is a liquid and the second fluid is a liquid. In other cases, the first fluid is a gas and the second fluid is a liquid. In some instances, the first channel may comprise more than two fluids (e.g., three, four, five, six, or more fluids).

In some embodiments, certain of the systems described herein may comprise components with small length scales (e.g., centimeter, millimeter, micrometer) and/or form at least a part of an apparatus comprising a small length scale component. For instance, a system may form at least a part of a millifluidic apparatus. As used herein, a millifluidic device contains at least one channel having a maximum cross-sectional diameter of less than 1 centimeter. In some instances, a system forms at least a part of a microfluidic apparatus. As used, herein, a microfluidic device contains at least one channel having a maximum cross-sectional diameter of less than 1 millimeter. It should be understood that the present disclosure is not limited to such small scale systems, and in other embodiments, larger scale channels and other system components may be used.

In some embodiments, one or more channels within the system may be substantially enclosed, with the exception of the channel inlet, the channel outlet, and any fluid-permeable medium that forms a portion of the channel wall (and, in certain instances, is used to perform separation of one fluid from at least one other fluid). In some embodiments, first fluidic channel 101 can be enclosed aside from inlet 109, outlet 107, and fluid-permeable medium 106. In certain embodiments, second fluidic channel 102 can be enclosed aside from outlet 108 and fluid-permeable medium 106.

In certain embodiments, one or more components of the system may be part of an integrated device. In some such cases, the component(s) cannot be removed from the integrated device without damaging the component(s). In other embodiments, the component(s) that are part of an integrated device share a common substrate (e.g., are mounted on a common substrate). For instance, in some embodiments, the fluid-permeable medium and the pressure regulator are each part of an integrated device, such that the pressure regulator cannot be removed without damaging it. In certain embodiments, the fluid-permeable medium is not in direct contact with the moveable surface of the pressure regulator.

In some embodiments, a method for separating a first fluid from a second fluid may use a system described herein. For instance, the method may utilize a system comprising a first fluidic channel, a second fluidic channel, a fluid-permeable medium, and a pressure regulator. The fluid-permeable medium may be positioned between the first fluidic channel and the second fluidic channel and have a permeability pressure differential with respect to the second fluid. The pressure regulator may be fluidically connected to the first fluidic channel and configured such that, when a first pressure within the first fluidic channel is below a sum of the permeability pressure differential of the fluid-permeable medium with respect to the fluid and a second pressure within the second fluidic channel, the fluid is substantially prevented from being transported through the first fluidic channel. The method may comprise, in certain embodiments, pre-wetting the fluid-permeable medium with the second fluid, flowing a mixture of the first and second fluid in the first channel, and separating the first fluid from the second fluid.

In one set of embodiments, a system comprises a first fluidic channel comprising a combination of a first fluid and a second fluid, wherein a portion of the first fluidic channel comprises the second fluid at least partially surrounded by the first fluid. In some such embodiments, the system also comprises a second fluidic channel and a fluid-permeable medium positioned between the first fluidic channel and the second fluidic channel such that the second fluid may be transported between the first and second fluidic channels via the fluid-permeable medium. The fluid-permeable medium can be wetted, in some embodiments, with the second fluid prior to contact with the combination of the first fluid and the second fluid and the fluid-permeable medium has a permeability pressure differential with respect to the second fluid. The system can further comprise, in some embodiments, a pressure regulator comprising a moveable surface. The moveable surface may be fluidically connected to and positioned between the first fluidic channel and the second fluidic channel, in some embodiments. The pressure regulator may be configured such that, when a first pressure present within the first fluidic channel is below the sum of the permeability pressure differential of the fluid-permeable medium with respect to the second fluid and a second pressure within the second fluidic channel, the first fluid is substantially prevented from being transported through the first fluidic channel.

The systems and methods described herein can be configured, in certain embodiments, to operate at relatively high flow rates. For example, in some embodiments, the systems and/or methods described herein can be configured to be operated while having a total flow rate of fluid through the system at or above about 1 microliter/min, at or above about 10 microliters/min, at or above about 100 microliters/min, at or above about 1 mL/min, at or above about 10 mL/min, at or above about 20 mL/min, at or above about 50 mL/min, at or above about 100 mL/min, at or above about 500 mL/min, or at or above about 1000 mL/min (and/or, in certain embodiments, up to about 10,000 mL/min, or more).

As used herein, the term "fluid" generally refers to a substance that tends to flow and to conform to the outline of its container. Typically, fluids are materials that are unable to withstand a static shear stress, and when a shear stress is applied, the fluid experiences a continuing and permanent distortion. The fluid may have any suitable viscosity that permits at least some flow of the fluid. Non-limiting examples of fluids include liquids and gases, but may also include free-flowing solid particles (e.g., colloids, vesicles, etc.), viscoelastic fluids, and the like.

As used herein, the "cross-sectional dimension" of a channel, slug, bubble, or any other article is measured perpendicular to the direction of fluid flow.

The channels described herein can have any cross-sectional shape (circular, oval, triangular, irregular, square or rectangular, or the like) and can be covered or uncovered. In embodiments where it is completely covered, at least one portion of the channel can have a cross-section that is completely enclosed, or the entire channel may be completely enclosed along its entire length with the exception of its inlet(s) and outlet(s). A channel may also have an aspect ratio (length to average cross sectional dimension) of at least 2:1, more typically at least 3:1, 5:1, or 10:1 or more.

The channels described herein may be of any size, for example, having a largest cross-sectional dimension of less than about 10 mm, less than about 5 mm, less than about 2 mm, less than about 1 mm, less than about 500 microns, less than about 200 microns, less than about 100 microns, less than about 60 microns, less than about 50 microns, less than about 40 microns, less than about 30 microns, less than about 25 microns, less than about 10 microns, less than about 3 microns, less than about 1 micron, less than about 300 nm, less than about 100 nm, less than about 30 nm, or less than about 10 nm. In other embodiments, larger channel dimensions can be chosen. In some cases the dimensions of the channel may be chosen such that fluid is able to freely flow through the channel and/or freely through an article or substrate in which the channel is positioned. The dimensions of the channel may also be chosen, for example, to allow a certain volumetric or linear flow rate of fluid in the channel. In some embodiments, the length of the channel may be selected such that the residence times of the first and second (or more) fluids at a predetermined flow rate are sufficient to achieve equilibrium (e.g., vapor-liquid equilibrium). Of course, the number of channels and the shape of the channels can be varied by any method known to those of ordinary skill in the art. In some cases, more than one channel may be used in place of a single channel.

In some, but not all embodiments, some or all components of the systems and methods described herein are microfluidic. "Microfluidic," as used herein, refers to a device, apparatus or system including at least one fluid channel having a largest cross-sectional dimension of less than about 1 mm. A "microfluidic channel," "microchannel," or "microscale channel" as used herein, is a channel meeting these criteria. In one set of embodiments, all fluid channels in the system are microfluidic.

In some, but not all embodiments, some or all components of the systems and methods described herein are millifluidic. "Millifluidic," as used herein, refers to a device, apparatus or system including at least one fluid channel having a largest cross-sectional dimension of less than about 1 cm. A "millifluidic channel" or a "millichannel" as used herein, is a channel meeting these criteria. In one set of embodiments, all fluid channels within the system are millifluidic.

In some embodiments, some or all components of the systems and methods described herein comprise channels are relatively large in scale (e.g., having a largest cross-sectional dimensions of greater than 1 cm).

A variety of materials and methods, according to certain aspects, can be used to form systems such as those described above. For example, in some embodiments, the fluid channels may comprise tubing such as, for example, flexible tubes (e.g., PEEK tubing), capillary tubes (e.g., glass capillary tubes), and the like. In some embodiments, various components can be formed from solid materials, in which microfluidic channels can be formed via micromachining, film deposition processes such as spin coating and chemical vapor deposition, laser fabrication, photolithographic techniques, etching methods including wet chemical or plasma processes, and the like. See, for example, *Scientific American*, 248:44-55, 1983 (Angell, et al). In one embodiment, at least a portion of the fluidic system is formed of silicon by etching features in a silicon chip. Technologies for precise and efficient fabrication of various fluidic systems and devices described herein from silicon are known. In some embodiments, various components of the systems and devices described herein can be formed of a polymer, for example, an elastomeric polymer such as polydimethylsiloxane ("PDMS"), polytetrafluoroethylene ("PTFE" or Teflon®), or the like. In some cases, various components of the system may be formed in other materials such as metal, ceramic, glass, Pyrex®, etc.

Different components can be fabricated of different materials. For example, a base portion including a bottom wall and side walls can be fabricated from a transparent or at least partially transparent material, such as glass or a transparent polymer, for observation and/or control of the fluidic process, and a top portion can be fabricated from an opaque material such as silicon. Components can be coated so as to expose a desired chemical functionality to fluids that contact interior channel walls, where the base supporting material does not have a precise, desired functionality. For example, components can be fabricated as illustrated, with interior channel walls coated with another material. Material used to fabricate various components of the systems and devices described herein, e.g., materials used to coat interior walls of fluid channels, may desirably be selected from among those materials that will not adversely affect or be affected by fluid flowing through the fluidic system, e.g., material(s) that is chemically inert in the presence of fluids to be used within the device.

In one embodiment, various components described herein are fabricated from polymeric and/or flexible and/or elastomeric materials, and can be conveniently formed of a hardenable fluid, facilitating fabrication via molding (e.g. replica molding, injection molding, cast molding, etc.). The hardenable fluid can be essentially any fluid that can be induced to solidify, or that spontaneously solidifies, into a solid capable of containing and/or transporting fluids contemplated for use in and with the fluidic network. In one embodiment, the hardenable fluid comprises a polymeric liquid or a liquid polymeric precursor (i.e. a "prepolymer"). Suitable polymeric liquids can include, for example, thermoplastic polymers, thermoset polymers, or mixture of such polymers heated above their melting point. As another example, a suitable polymeric liquid may include a solution of one or more polymers in a suitable solvent, which solution forms a solid polymeric material upon removal of the solvent, for example, by evaporation. Such polymeric materials, which can be solidified from, for example, a melt state or by solvent evaporation, are well known to those of ordinary skill in the art. A variety of polymeric materials, many of which are elastomeric, are suitable, and are also suitable for forming molds or mold masters, for embodiments where one or both of the mold masters is composed of an elastomeric material. A non-limiting list of examples of such polymers includes polymers of the general classes of silicone polymers, epoxy polymers, and acrylate polymers. Epoxy polymers are characterized by the presence of a three-membered cyclic ether group commonly referred to as an epoxy group, 1,2-epoxide, or oxirane. For example, diglycidyl ethers of bisphenol A can be used, in addition to compounds based on aromatic amine, triazine, and cycloaliphatic backbones. Another example includes the well-known Novolac polymers. Non-limiting examples of silicone elastomers suitable for use according to certain embodiments include those formed from precursors including the chlorosilanes such as methylchlorosilanes, ethylchlorosilanes, phenylchlorosilanes, etc.

In some embodiments, systems, described herein, may be manufactured using mesoscale fabrication techniques known to those of skill in the art. In certain embodiments, larger systems can be fabricated using traditional machining techniques known to those of skill in the art. For example, channels, inlets, outlets, and the like can be fabricated using machining tools (e.g., micromachining tools and/or larger or smaller scale machining tools), laser drilling and/or etching, milliscale and/or larger scale molding techniques, and/or other fabrication methods and tools known to those of ordinary skill in the art.

The following examples are intended to illustrate certain embodiments of the present invention, but do not exemplify the full scope of the invention.

EXAMPLE 1

This example describes the fabrication of a liquid-liquid separator comprising a liquid-permeable membrane and a diaphragm-based pressure regulator.

Figure 2A:
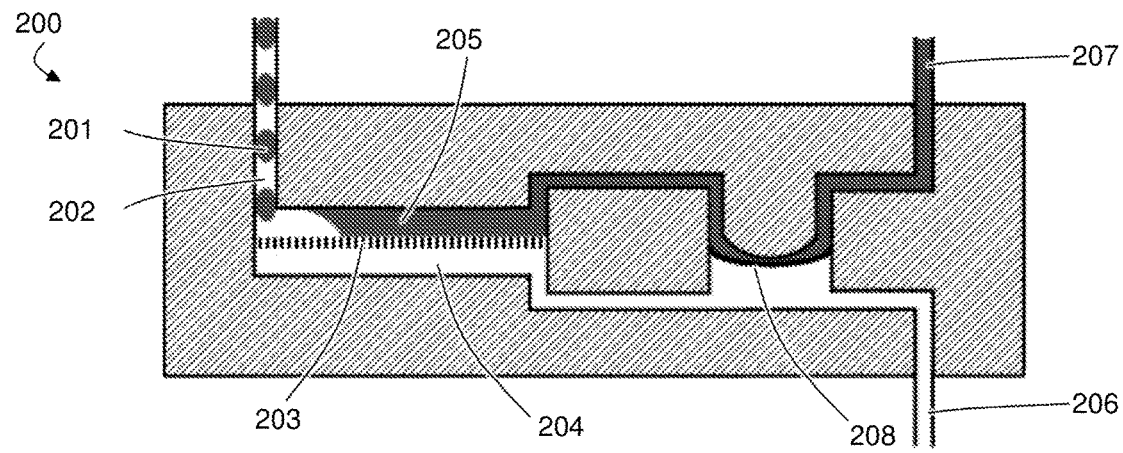
FIGS. 2A-2C are cross-sectional schematic diagrams of fluidic systems, according to certain embodiments.
Figure 2B:
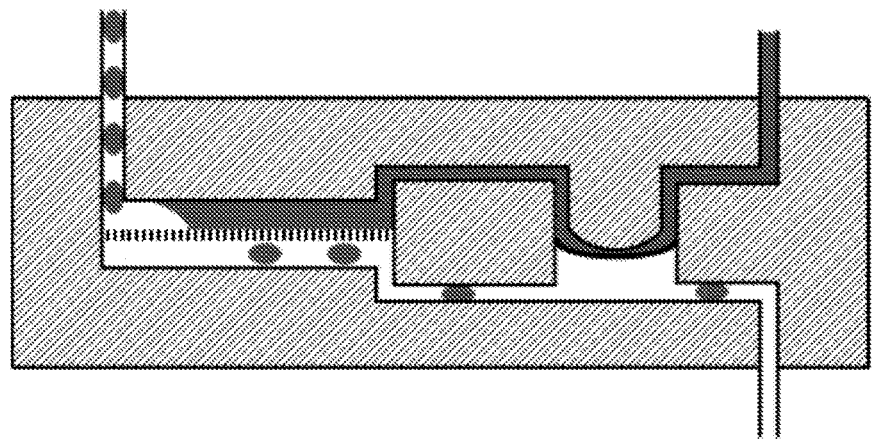
Figure 2C:
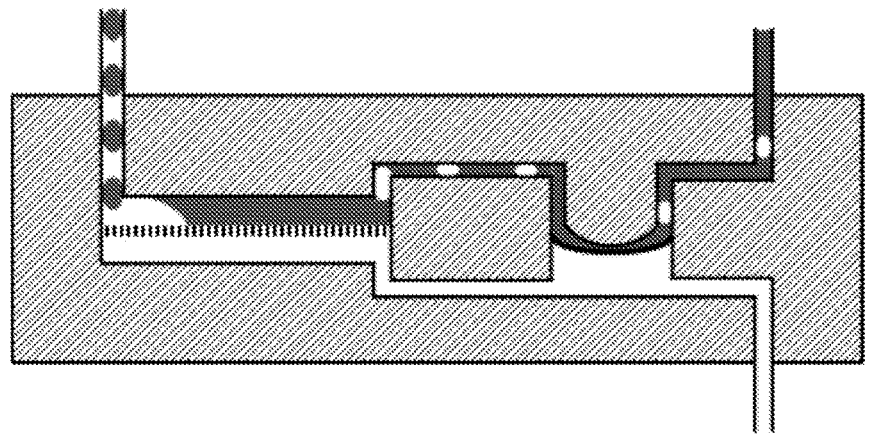

FIGS. 2A-2C are a series of cross-sectional schematic illustrations illustrating modes of operation of a membrane-based liquid-liquid separator 200. FIG. 2A is a cross-sectional schematic illustration showing an intended mode of operation, in certain embodiments, in which a mixture of a first fluid 201 and a second fluid 202 are transported to a membrane 203. Second fluid 202 is passed through membrane 203 to permeate side 204 while first fluid 201 is retained on retentate side 205 of the membrane. Separator 200 can be used to produce first separated fluidic stream 206 and second separated fluidic stream 207.

There are two main failure modes for the membrane-based separator illustrated in FIG. 2A. The first failure mode is illustrated in FIG. 2B, and involves breakthrough of the retained phase, which occurs when the pressure difference across the membrane (transmembrane pressure, $\Delta P_{mem}$) is greater than $P_{cap}$, defined as described elsewhere herein:

$$P_{cap} = \frac{2\gamma\cos(\theta)}{r} \qquad [2]$$

The second failure mode is illustrated in FIG. 2C, and involves the permeate phase being partially retained by the membrane and exiting with the retained phase. This occurs when there is insufficient pressure to cause the permeate liquid to flow through the membrane ($\Delta P_{per}$) which can be approximated by $$\Delta P_{per} = \frac{8\mu QL}{n\pi R^4} \quad [1]$$

where, in the case of a membrane, $\mu$ is the viscosity of the permeate phase, Q is the volumetric flow rate of the fluid transported across the membrane, L is the membrane thickness, n is the number of pores within the membrane, and R is the radius of the pores within the membrane. This equation assumes that the membrane acts as an array of cylindrical pores which is a generally acceptable assumption. The value of $\Delta P_{per}$ is the minimum pressure differential required to drive all of the permeate phase through the membrane using the entire area. Separation will still occur at values of $\Delta P_{mem}$ greater than $\Delta P_{per}$, but the entire membrane area is generally not utilized in such cases (n is smaller such that Equation 1 equals $\Delta P_{mem}$). In this case, the non-active pores support the additional pressure using the interfacial tension force. This is possible for values of $\Delta P_{mem}$ up to the point when breakthrough occurs, described as the first failure mode and illustrated in FIG. 2B. It is noted that a third failure mode can exist where two phase streams exit both outlets, but this is indicative of operating the separator at a flow rate excessive for the available membrane area, and is therefore a condition that is generally not encountered.

When the pressure drop along the length of the membrane channel is negligible compared to $P_{cap}-\Delta P_{per}$, then these two failure modes can be described in a single compound inequality $$P_{cap} > \Delta P_{mem} > \Delta P_{per} \quad [3]$$

since $\Delta P_{mem}$ can be assumed to be constant along the membrane. This assumption is generally satisfied when the channel is sized so that pressure drops along its length are negligible. The first inequality can be satisfied by selecting an appropriate membrane (e.g., made of an appropriate material and having appropriate dimensions and pore sizes, etc.) for use in the separator.

The second inequality in Equation 3 can be evaluated by replacing $\Delta P_{mem}$ with $P_1-P_2$, where $P_1$ is the pressure on the retentate side of the membrane and $P_2$ is the pressure on the permeate side of the membrane. The second inequality in Equation 3 can be rewritten as:

$$P_{cap} + P_2 > P_1 > \Delta P_{per} + P_2 \quad [4]$$

Equation 4 shows that successful designs can be made by ensuring that the separator operates under conditions in which the retentate pressure is some value greater than the sum of the permeate pressure and the $\Delta P_{per}$ value for the maximum flow rate desired through the membrane.

It has been found that appropriate pressure control can be achieved by incorporating a pressure control segment into the liquid-liquid separator. The schematic illustrations of the membrane separators in FIGS. 2A-2C include a pressure control segment immediately following the separation membrane. The pressure control segment includes a diaphragm 208 stretched over the retentate stream with the permeate stream flowing on the reverse side. The diaphragm can be arranged to seal against the retentate flow path such that no flow exits the retentate side of the separator unless the pressure on the retentate side of the membrane ($P_1$) is greater than the pressure on the permeate side of the membrane ($P_2$). Additionally, the membrane can be slightly deformed, which can convey an additional force on the retentate flow path that must be exceeded to permit flow. Generally, the differential pressure that is applied increases with the amount of deformation, the thickness of the diaphragm, and the elastic modulus of the diaphragm. The diaphragm can then act as a differential pressure controller such that $P_1=P_{dia}+P_2$, where $P_{dia}$ is the additional pressure due to the deformation of the diaphragm. Arranging the diaphragm in this manner allows Equation 4 to be simplified to:

$$P_{cap} > P_{dia} > P_{per} \quad [5]$$

According to Equation 5, an appropriately designed separator will achieve complete separation as long as the flow rate through the membrane remains below the maximum value for the design (i.e., as long as pressure drops along channels are negligible).

Figure 3:
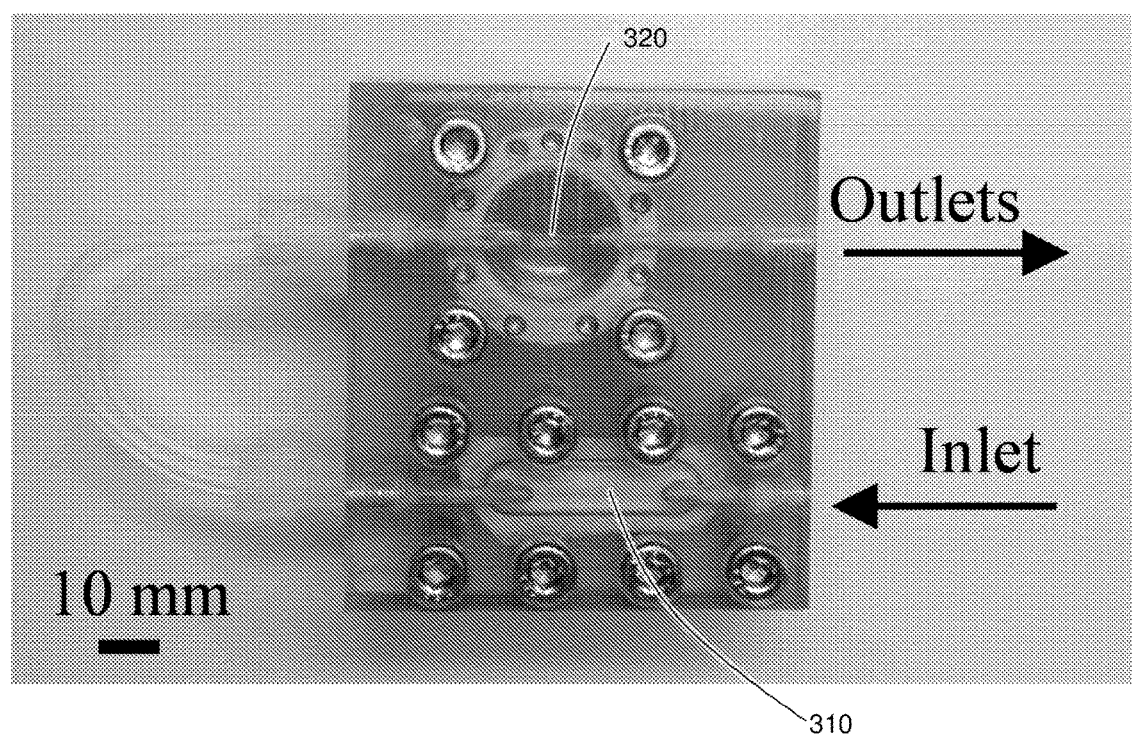
FIG. 3 is a photograph of a fluidic system, according to some embodiments.

Exemplary liquid-liquid separators were fabricated to test the effectiveness of the diaphragm-based pressure regulator. An inlet fluidic channel (configured to receive a mixture of two fluids) was formed into a first piece of high molecular weight polyethylene (HDPE) bulk material using conventional machining tools. Fluidic outlets were formed into the first piece of HDPE bulk material (the retentate outlet) and a second piece of HDPE bulk material (the permeate outlet) using the machining tools. The first and second pieces of HDPE bulk material were also each machined to include a first cavity (to be placed adjacent a membrane separator) and a second cavity (to be positioned adjacent a diaphragm-based pressure regulator). After placing the membrane separator and the diaphragm into their respective cavities, the two halves of HDPE bulk material were aligned and connected to each other using off the shelf screws and O-rings. FIG. 3 shows a photograph of an exemplary liquid-liquid separator. The separator shown in FIG. 3 was made of polycarbonate, although the experiments described in the examples were performed using dimensionally similar separators made of HDPE.

A Pall Zefluor 1 µm PTFE microfiltration membrane (labeled 310 in FIG. 3) was integrated into the separator. The membrane had a total surface area of 280 mm² (roughly 35 mm long by 8 mm wide) and a membrane channel dimension of about 1 mm. During use, the membrane was wetted by a permeating organic phase and retained an aqueous phase. No change in membrane performance was observed with different solvents due to mechanical changes in the membrane.

The diaphragm (labeled 320 in FIG. 3) was made of a perfluoroalkoxy (PFA) film having a thickness of 50 µm.

All pumping was performed using piston pumps from Knauer (Smartline pump 100), Eldex (Optos 2SIP), and Fuji Techno Industries (Super metering pump HYM-08).

The separator was initially tested by removing the loops connecting the separation membrane with the differential pressure controller and attaching 235 cm of 1.6 mm inner diameter (ID) tubing to the permeate outlet and 60 cm of 0.76 mm ID tubing and 183 cm of 1.6 mm ID tubing to the retentate outlet. Previously contacted and separated water and ethyl acetate were each pumped at 5 mL/min into a tee mixer and then passed into the membrane separator. Pressure variations across the membrane were controlled by varying the height of the outlets over 2 meters and calculating the pressure at the membrane. Failure points were calculated using Equation 3. The values for R and L were taken from the manufacturer's specifications and n was calculated by measuring the membrane flow resistance by flowing only toluene and measuring the flow rate split between the two outlets. The value of γ was taken from the literature as 36.1 mN/m for toluene-water and 6.8 mN/m for ethyl acetate-water. The differential pressure controller was tested by measuring the flow rate split between the two outlets when flowing only toluene through the device. 50 cm of 0.51 mm ID tubing was added to increase the pressure drop on the permeate side of the membrane so that flow exited both outlets.

Figure 4:
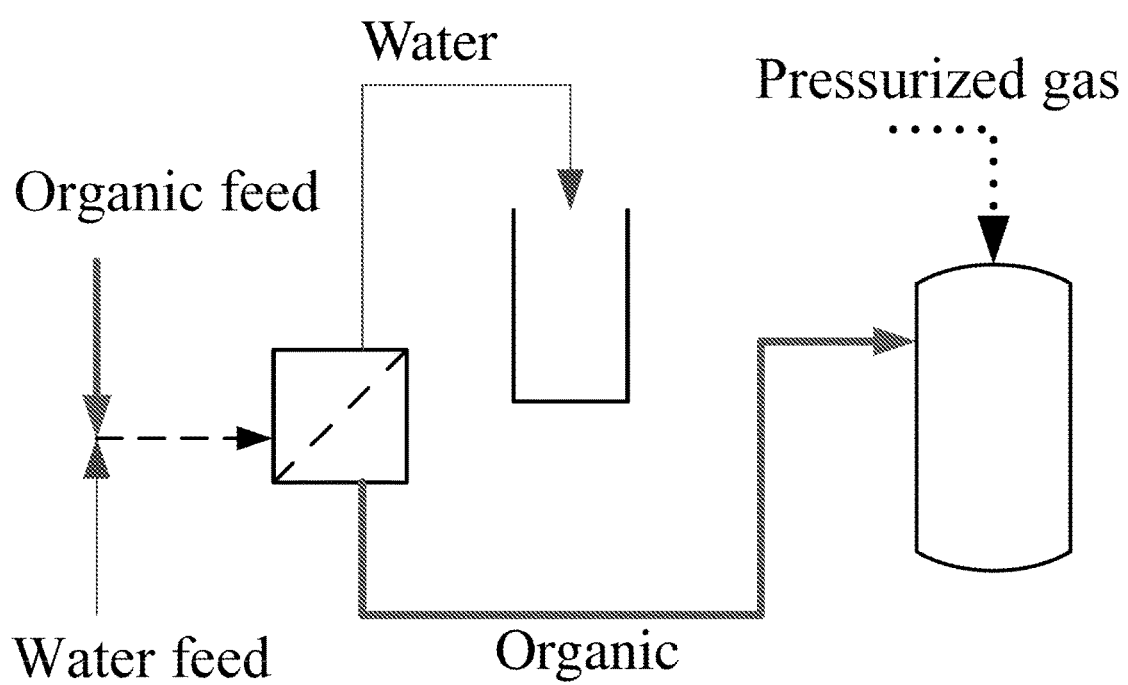
FIG. 4 is a schematic of a test setup for a system comprising an external pressure regulator, according to certain embodiments.

Characterization of the new separator design where the membrane was coupled to the pressure controller was done using the set up shown in FIG. 4. In FIG. 4, organic phase lines are shown in bold lines and arrows, water phases are shown in regular weight lines and arrows, and two phase streams are shown as dashed lines and arrows. The organic outlet of the separator entered a closed vessel pressurized by a gas.

Hexane-water and ethyl acetate-water pairs were tested. The hexane-water pair provided an initial test bed for the system with a wide operating range due to a high interfacial tension (50 mN/m). The ethyl acetate-water pair was a more challenging separation as the interfacial tension between the two fluids is an order of magnitude lower (6.8 mN/m), thus restricting the pressure difference operating window for successful separation. Flow rates between 2 and 8 mL/min for both the aqueous and organic phase were tested with these solvents as shown in FIG. 4. Additionally to test the robustness of the pressure controller, the pressure in the collection reservoir of the organic side was changed to apply backpressure to the separator simulating downstream pressure drop (0, 1, 1.4, and 2 bar were used).

Figure 7:
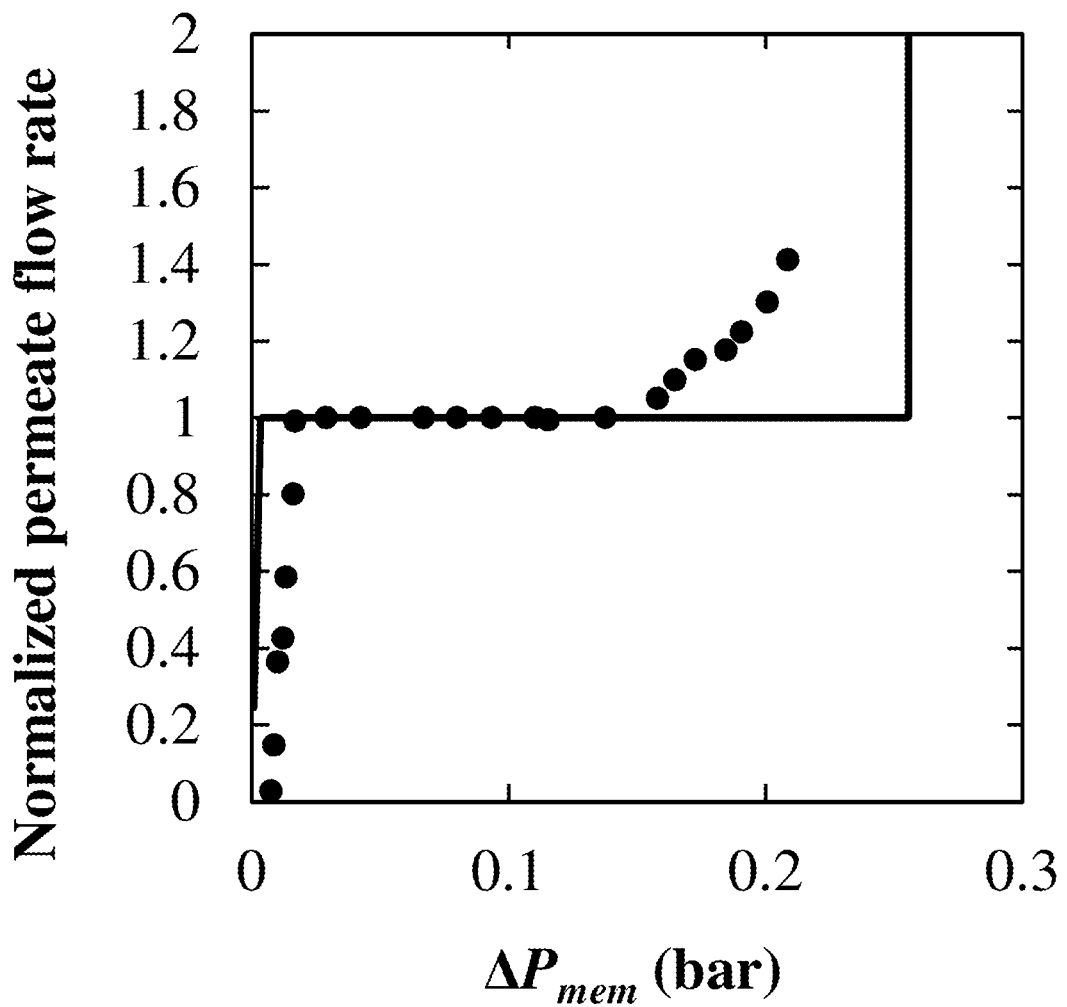
FIG. 7 is a plot of model and experimental results of a system in which a pressure regulator is not employed, according to one set of embodiments.

The separator was operated without the diaphragm-based differential pressure controller while feeding a 1:1 ethyl acetate-water mixture at 10 mL/min (i.e., 5 mL/min each of ethyl acetate and water). FIG. 7 is a plot of model (based on Equations 1, 2, and 4) and experimental results of the membrane separator without the pressure control diaphragm. The flow rate through the permeate outlet was normalized by dividing it by the inlet organic flow rate and is plotted versus $\Delta P_{mem}$. A normalized permeate flow rate value of 1 corresponds to a perfect separation. Model values are shown by the solid line while experimental values are given by circles. While the performance of the separator is qualitatively similar to the model, breakthrough of the aqueous phase happens at much lower $\Delta P_{mem}$ values than was predicted by the model. Without wishing to be bound by any particular theory, it is believed that this differentiation in behavior was indicative of a pore size distribution where a small number of pores with larger radii allowed the aqueous phase through while the other pores still prohibited flow. This result is similar to a bubble point test; however, a bubble point test typically only identifies a critical pressure, converted to pore size using Equation 2, while this result shows a gradual increase in permeation as $\Delta P_{mem}$ is increased. This demonstrates that even if the largest pores are compromised, complete loss of separation will generally not occur as the low number of large pores cannot support the full flow of the retained phase. While Equation 5 can be expressed in terms of pore size distribution, separation should occur as long as the $P_{cap}$ for the largest pores (determined empirically) is heeded.

The large flat region in FIG. 7 shows that the design parameters described above can be used to select an appropriate $P_{dia}$ for the differential pressure controller to allow separation by operating below the empirically determined $P_{cap}$.

Figure 8:
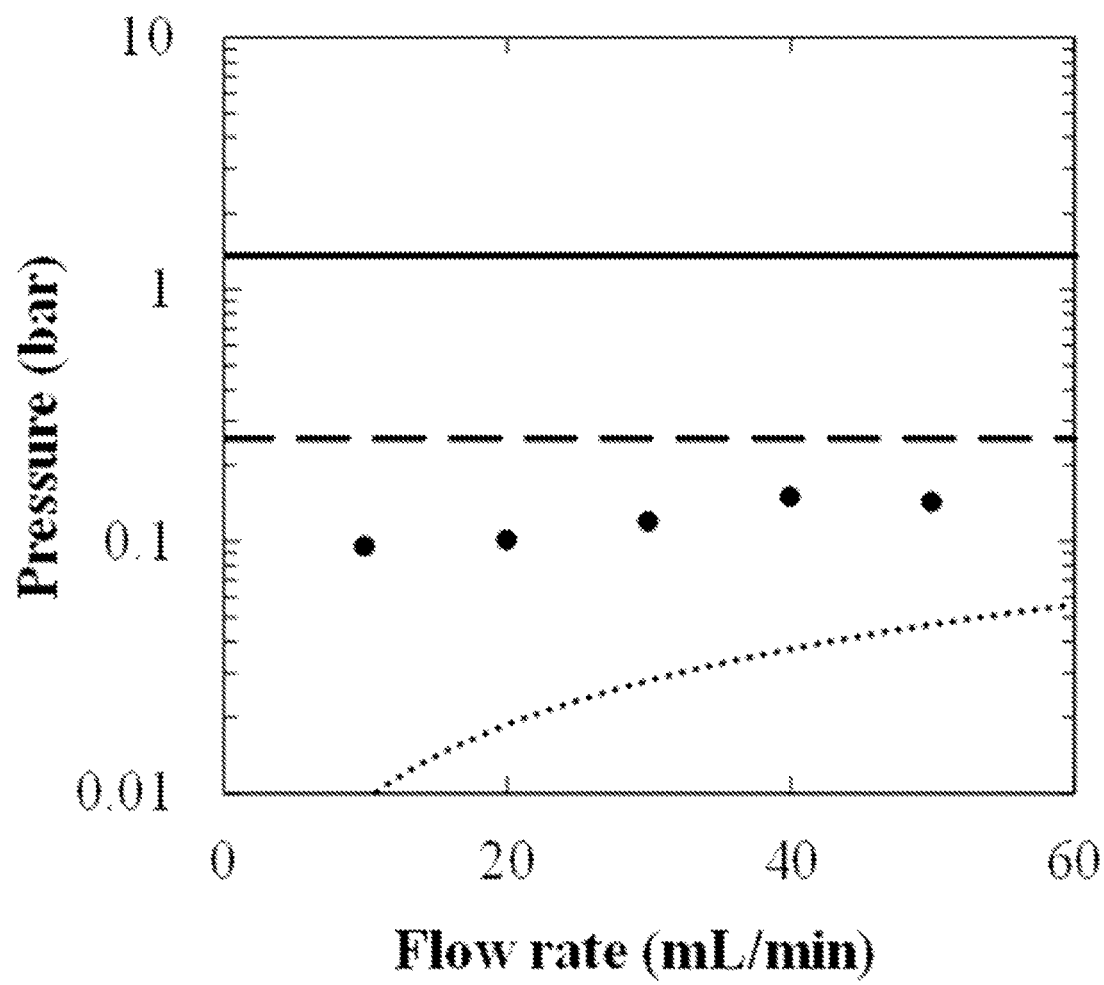
FIG. 8 is a plot of the pressure versus flow rates for a fluidic system, according to one set of embodiments.

Additional experiments were performed in which the differential pressure controller was integrated into the system, as illustrated in FIGS. 2A-2C. FIG. 8 is a plot of the pressure across the membrane versus the measured flow rates (circles) when the differential pressure was employed. The solid and dashed lines in FIG. 8 represent $P_{cap}$ for a toluene-water and ethyl acetate-water separation, respectively. The dotted line in FIG. 8 represents $\Delta P_{per}$ for each flow rate. FIG. 8 shows that the differential pressure controller performance across a wide range of flow rates is fairly constant and within an acceptable range for most applications. The values of $P_{cap}$ for both the toluene/water and ethyl acetate/water systems and the values of $\Delta P_{per}$ for each flow rate bound the values for $P_{dia}$ meaning the separator satisfies Equation 5 and should separate effectively. FIG. 8 shows that even with increasing flow rate, $P_{dia}$, which equals $\Delta P_{mem}$ in the device, will remain constant and therefore separation performance remains constant. This is generally not true when the differential pressure controller is not present and downstream pressure drops change due to varying flow rates.

Results from the testing of the operation of a single separator with the integrated pressure controller are shown in Table 1 below. The results in Table 1 show that as back pressure increases, a modest breakthrough can be observed for the ethyl acetate-water pair. This can be interpreted in light of the results of FIGS. 7 and 8. FIG. 7 shows that the ethyl acetate-water system begins to allow breakthrough of the aqueous phase at 0.15 bar while FIG. 8 shows that $P_{dia}$ was between 0.1 and 0.15 bar for single phase flow. High pressures applied to the organic outlet can cause small deviations in the performance of the pressure control diaphragm, slightly increasing $P_{dia}$ which was sufficient to cause some breakthrough in the ethyl acetate-water system. Importantly, the hexane-water system has a sufficiently high $P_{cap}$ that the small increase in $P_{dia}$ did not cause any failure in separation across all the conditions tested.

TABLE 1

Summary of performance of a membrane separator with integrated pressure control.

| | Aqueous flow rate | Organic flow rate | Normalized permeate flow rate Backpressure on organic outlet | | | |
|---|---|---|---|---|---|---|
| | mL/min | mL/min | 0 bar | 1 bar | 1.4 bar | 2 bar |
| Hexane-water | 2 | 2 | 1 | 1 | 1 | 1 |
| | 5 | 5 | 1 | 1 | 1 | 1 |
| | 8 | 8 | 1 | 1 | 1 | 1 |
| | 2 | 8 | 1 | 1 | 1 | 1 |
| | 8 | 2 | 1 | 1 | 1 | 1 |
| Ethyl acetate-water | 2 | 2 | 1 | 1 | 1.0425 | 1.0500 |
| | 5 | 5 | 1 | 1.0108 | 1.0384 | 1.0930 |
| | 8 | 8 | 1 | 1.0159 | 1.0476 | 1.1180 |
| | 2 | 8 | 1 | 1 | 1.0625 | 1.2420 |
| | 8 | 2 | 1 | 1.0213 | 1.0492 | 1.0123 |

EXAMPLE 2

Figure 5:
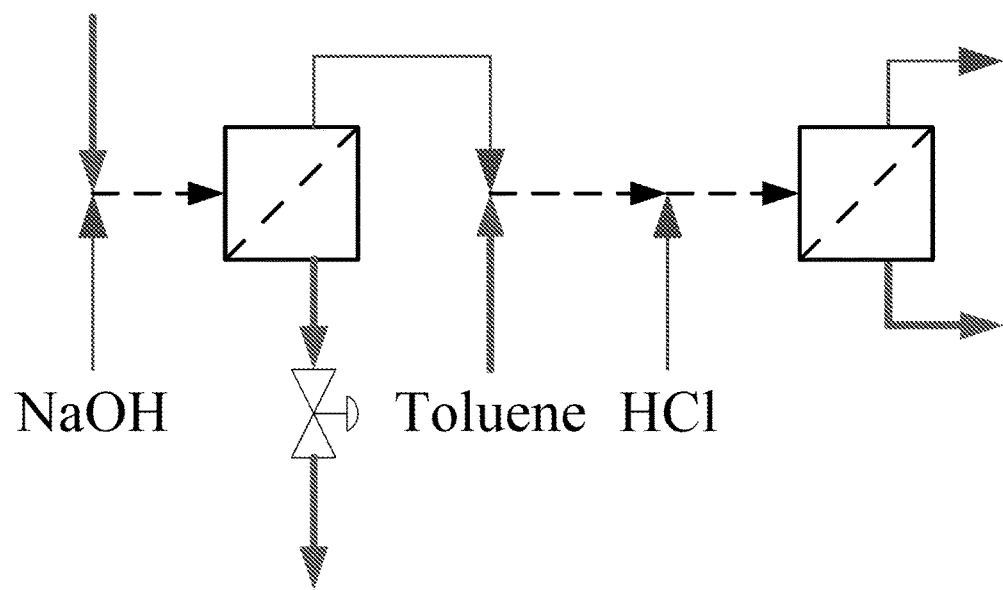
FIG. 5 is a flow diagram of a solvent swap setup, according to some embodiments.

The ability to change solvents between successive synthesis steps ("solvent swap") is an important consideration in when choosing optimum solvents for individual processes within multi-process systems. This example describes the use of the liquid-liquid separator described in Example 1 to perform a two-stage solvent swap. FIG. 5 is a schematic illustration of the solvent swap system, in which organic phases are shown in bold lines and arrows, water phases are shown in regular weight lines and arrows, and two phase streams are shown as dashed lines and arrows.

A stream of 0.34 M benzoic acid in ethyl acetate was pumped at 1 mL/min into a mixing tee to contact a stream of 0.55 M NaOH flowing at 1 mL/min. A HDPE liquid-liquid separator (as described in Example 1) was used to split the phases, with the organic phase passing through the membrane and through an additional 0.6 bar backpressure controller. For this set of experiments, the backpressure controller was added to keep the organic outlet at a higher pressure than the aqueous, to prevent excess pressure on the aqueous outlet (in this case due to the second separator) causing a breakthrough of the aqueous phase by overriding the differential pressure controller.

The aqueous phase containing benzoic acid then contacted a 1 mL/min stream of toluene. After passing through a short length of tubing, a 1 mL/min stream of 0.6 M HCl was added to the benzoic acid-toluene mixture. The stream was then separated by a second, substantially identical membrane separator. Tubing with lengths to provide more than 10 seconds of residence time were used to allow the streams to reach equilibrium prior to separation. All tubing used was 1.6 mm ID. The flow rate of each outlet stream was measured by collection in graduated cylinders and the concentration of benzoic acid was determined by HPLC (Agilent 1100 with UV detector, 30 mM $H_3PO_4$ aqueous mobile phase, and 1:1 acetonitrile:methanol organic mobile phase). The results were compared to a comparable batch extraction performed at a 50 mL scale in separatory funnels with careful measurement of volumes.

The results of the solvent swap are summarized in Table 2. The continuous system reproduced the batch performance both in terms of yield and mass balance. The system was operated for 2 hours (corresponding to over 60 residence volumes) without any failure in the separation and halted without failure of the separation. No additional control was required beyond starting each pump sequentially (the first stage pumps, then the second stage pumps, etc.). This example demonstrates how the separator effectively decouples the membrane pressures from effects downstream when the pressure on the organic outlet is greater than the aqueous outlet. The 0.6 bar of backpressure on the first stage permeate (organic) outlet would normally prevent flow without the presence of the differential pressure controller. Without the differential pressure control diaphragm, the backpressure would prevent all flow through the membrane and halt any separation. This is similar to the effect when a separator is used to separate an organic phase which contains the reactant for a subsequent reaction. Normally increased pressure required for a second reactor (to increase the boiling point of a solvent or due to a fixed bed) would require additional pressure control on the retentate (aqueous, in this case) side to closely match the organic pressure. The differential pressure controller simplifies the system by negating the need for the retentate side pressure control.

TABLE 2

Summary of solvent swap results comparing a batch shake flask and continuous with two membrane separators. Error values are one standard deviation of 4 samples taken over the 2 hour run.

|  | Yield | Mass balance |
| --- | --- | --- |
| Continuous | 0.92 +/− 0.006 | 0.97 +/− 0.008 |
| Shake flask | 0.94 | 0.96 |

A similar situation was observed on the retentate side of the first separator in that it fed a second separator with a differential pressure controller that elevated the pressure. The effects of this pressure on the first separator were eliminated by adding a static backpressure regulator to the permeate side of the first separator larger than the highest pressure the retentate side might see. In certain instances, if this was not done, the first separator would not effectively separate, but after adding the fixed regulator, no additional control was required as long as the retentate pressure remained below 0.6 bar. The first stage was completely isolated from the second stage such that even during startup when the second stage was not running, the first stage separated both streams. No additional adjustments were needed to maintain separation when the second stage was started up.

EXAMPLE 3

Figure 6:
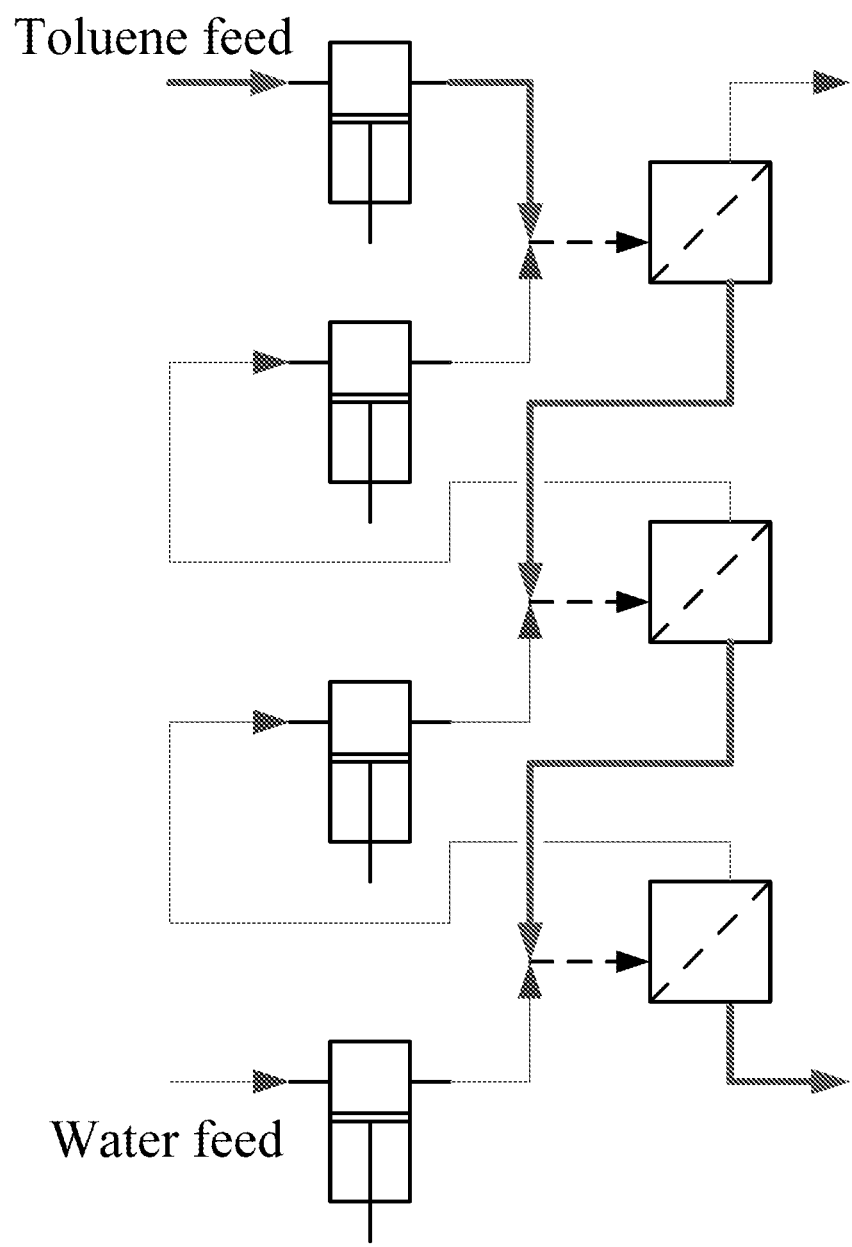
FIG. 6 is a flow diagram of countercurrent extraction setup, according to certain embodiments.

This example describes the use of the liquid-liquid separator described in Example 1 to perform countercurrent extraction. FIG. 6 is a schematic illustration of the countercurrent extraction system, in which organic phases are shown in bold lines and arrows, water phases are shown in regular weight lines and arrows, and two phase streams are shown as dashed lines and arrows.

Toluene and water were used as solvents with acetone as the extractant added at a 0.05 mass ratio to either solvent. The toluene feed was pumped by a single pump while a separate aqueous phase pump was used at each stage to increase the pressure so countercurrent operation was achieved. All pumps were set to 3 mL/min. All tubing was 0.76 mm ID PFA with sufficient lengths to allow equilibrium before separation at each stage (residence time greater than 5 seconds). The outlet flow rates were measured and the concentration of acetone was determined by HPLC (Agilent 1100 with RI detector and 5 mM $H_2SO_4$ isocratic mobile phase) for the aqueous phase and GC (HP 6890 with FID detection) for the organic phase. Samples were taken after 15 min of operation, with 3-5 repeats over the first hour.

Figure 9A:
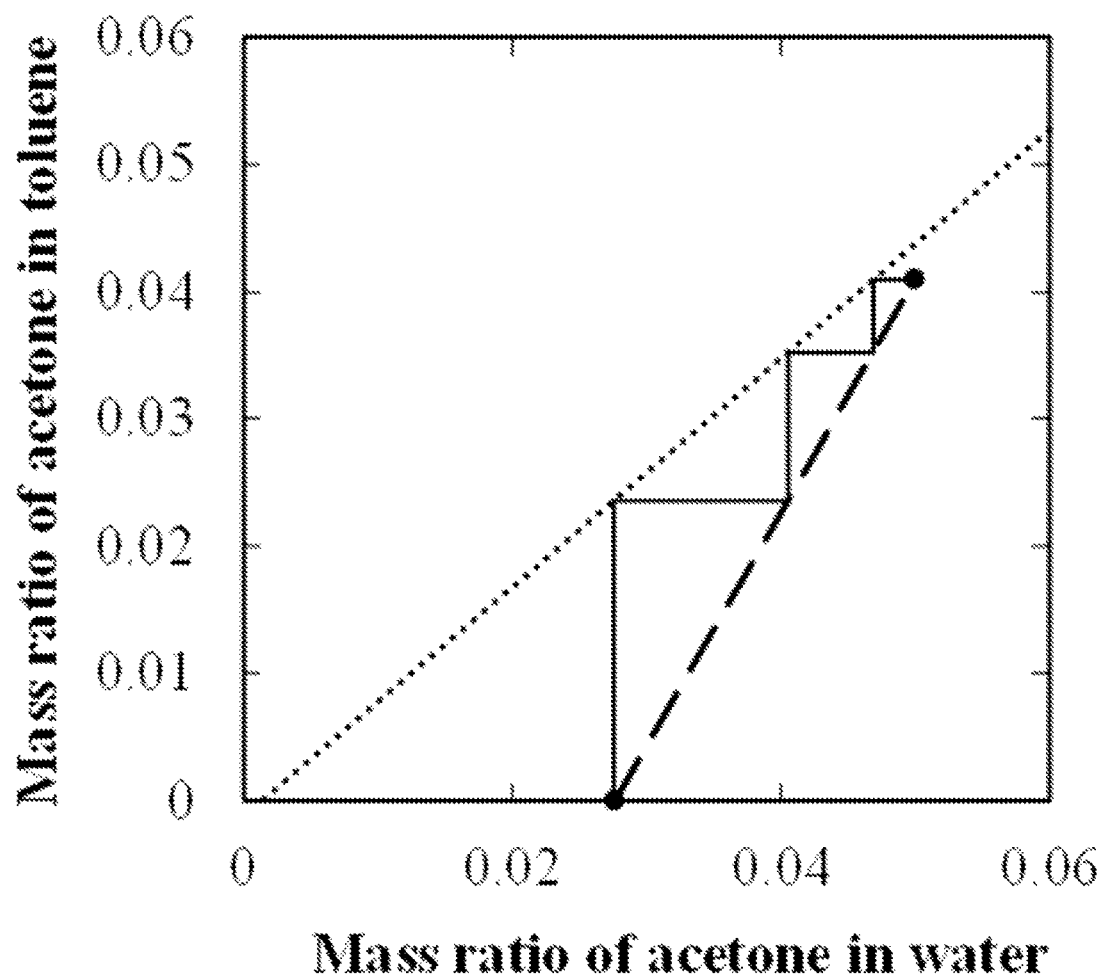
FIG. 9A is an extraction diagram for extraction of acetone from water into toluene, according to certain embodiments.
Figure 9B:
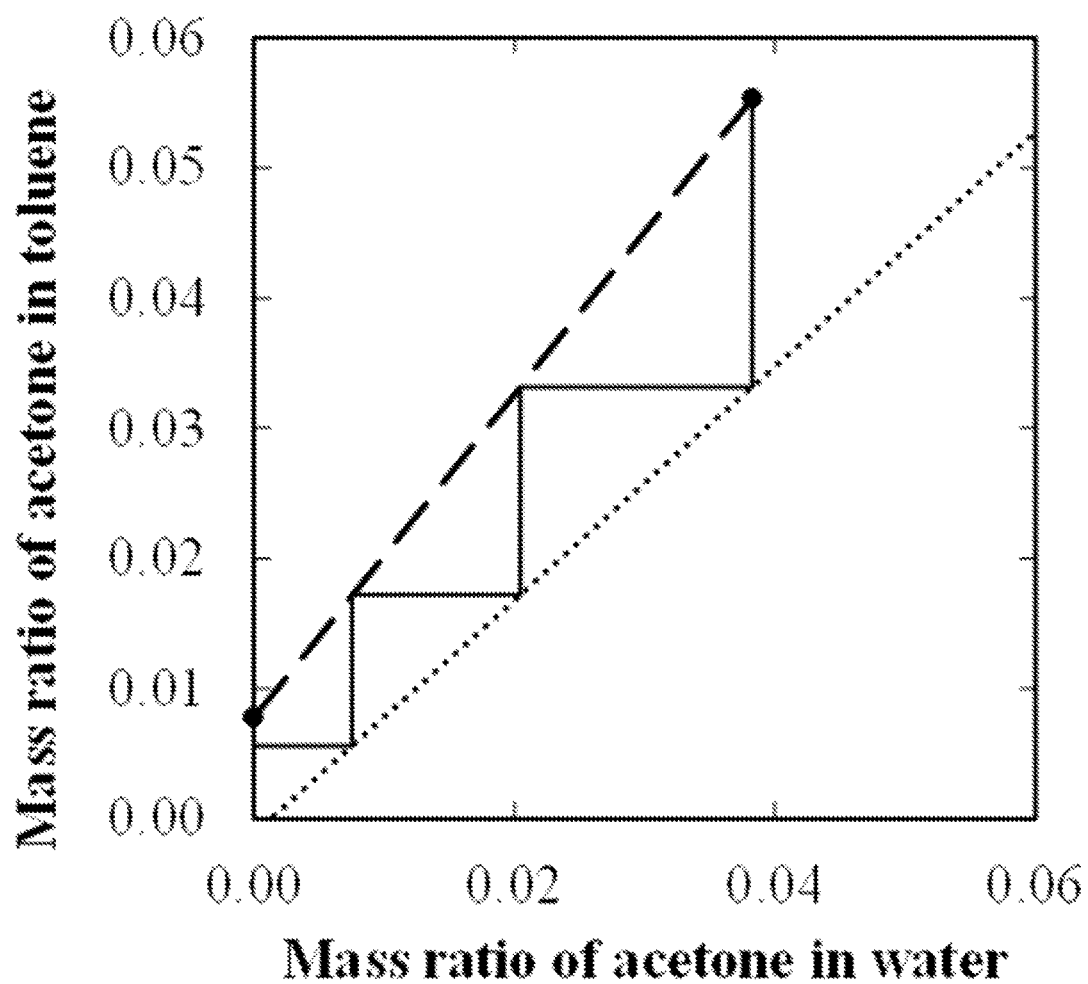
FIG. 9B is an extraction diagram for extraction of acetone from toluene into water, according to one set of embodiments.

Performance was determined using standard countercurrent extraction plots. FIG. 9A is an extraction diagram for the extraction of acetone from water into toluene. FIG. 9B is an extraction diagram for the extraction of acetone from toluene into water. The equilibrium curve is shown by a dotted line and the operating line is shown by the dashed line; stages are stepped off with a solid line. The separator achieved three stages of extraction when extracting acetone from either toluene or water. It is believed that the high mass transfer rates in slug flow ensured that equilibrium was achieved before separation at each stage. Since extraction and separation occur independently, it is believed that this system could be scaled to a large number of stages with additional separators and pumps without any extraction efficiency issues. This is an improvement over other small scale countercurrent systems which generally have a low number of stages and are limited in their flow rate by stage efficiencies related to the throughput. The decoupling of the pressure in each stage makes the setup and operation of the countercurrent separator simple. The system generally needed to be initially primed with solvent for each phase as the piston pumps struggled to handle two phase streams. After turning on each pump, the system then operated without any outside control for over 1 hour, eliminating level control between stages for mixer/settler systems.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A system, comprising:
   a first fluidic channel;
   a second fluidic channel;
   a liquid-permeable medium positioned between the first fluidic channel and the second fluidic channel such that the liquid-permeable medium forms at least a portion of a wall of the first fluidic channel and at least a portion of a wall of the second fluidic channel; and
   a pressure regulator comprising a moveable surface positioned between the first fluidic channel and the second fluidic channel such that the pressure regulator forms at least a portion of a wall of the first fluidic channel and at least a portion of a wall of the second fluidic channel,
   wherein the liquid-permeable medium is arranged such that liquid can be transported from the first fluidic channel, through the liquid-permeable medium, and into the second fluidic channel.

2. The system of claim 1, wherein the pressure regulator passively controls flow of fluid through the first fluidic channel.

3. The system of claim 1, wherein the liquid-permeable medium comprises a plurality of fluid passageways.

4. The system of claim 1, wherein the liquid-permeable medium comprises a membrane.

5. The system of claim 1, wherein the liquid-permeable medium comprises an array of microfabricated channels.

6. The system of claim 1, wherein the moveable surface is part of a deformable diaphragm.

7. The system of claim 6, wherein the deformable diaphragm is elastic.

8. The system of claim 7, wherein the deformable diaphragm has a modulus of elasticity of at least about 0.01 GPa.

9. The system of claim 1, wherein the first fluidic channel contains a first fluid and a second fluid.

10. The system of claim 9, wherein the system is configured to at least partially separate the first fluid from the second fluid.

11. The system of claim 9, wherein the system is configured such that at least about 80 vol % of the first fluid that is transported through the first fluidic channel is retained by the liquid-permeable medium and at least about 80 vol % of the second fluid that is transported through the first fluidic channel is transported through the liquid-permeable medium.

12. The system of claim 9, wherein the liquid-permeable medium is wetted by the second fluid.

13. The system of claim 9, wherein the second fluid preferentially wets the liquid-permeable medium relative to the first fluid.

14. The system of claim 1, wherein the system forms at least a part of a millifluidic apparatus.

15. The system of claim 1, wherein the system forms at least a part of a microfluidic apparatus.

16. The system of claim 1, wherein the liquid-permeable medium is not in direct contact with the moveable surface of the pressure regulator.

17. The system of claim 1, wherein the liquid-permeable medium and the pressure regulator are both part of an integrated device.

18. The system of claim 1, wherein when a pressure differential across the pressure regulator is substantially zero, the moveable surface of the pressure regulator is in a first non-zero state of stress and is in contact with a wall of the first fluidic channel over a first surface portion of the moveable surface.

19. The system of claim 1, wherein the pressure regulator comprises:
a flexible diaphragm positioned between the first fluidic channel and the second fluidic channel, wherein the diaphragm is configured such that:
when a pressure differential across the flexible diaphragm is substantially zero, the flexible diaphragm is in a first non-zero state of stress and is in contact with a wall of the first fluidic channel over a first surface portion of the diaphragm, and
when a pressure differential across the flexible diaphragm is greater than a threshold value, the flexible diaphragm is not in contact with the wall of the first fluidic channel or is in contact with the wall of the first fluidic channel over a second surface portion of the diaphragm that is smaller than the first surface portion of the diaphragm.

20. The system of claim 1, wherein the pressure regulator is downstream of the liquid-permeable medium.

21. The system of claim 1, wherein the liquid-permeable medium has a permeability pressure differential with respect to a fluid in the first fluidic channel and wherein, when a first pressure within the first fluidic channel is below a sum of the permeability pressure differential of the liquid-permeable medium with respect to the fluid and a second pressure within the second fluidic channel, the fluid is substantially prevented from being transported through an outlet of the first fluidic channel.

22. The system of claim 1, wherein a pressure required to deform the moveable surface is greater than or equal to 0.001 psi and less than or equal to 40 psi.

23. The system of claim 9, wherein the first fluid is a liquid and the second fluid is a liquid.

24. The system of claim 9, wherein the first fluid is a gas and the second fluid is a liquid.

25. A system, comprising:
a first fluidic channel;
a second fluidic channel;
a fluid-permeable medium positioned between the first fluidic channel and the second fluidic channel such that the fluid-permeable medium forms at least a portion of a wall of the first fluidic channel and at least a portion of a wall of the second fluidic channel; and
a pressure regulator comprising a moveable surface positioned between the first fluidic channel and the second fluidic channel such that the pressure regulator forms at least a portion of a wall of the first fluidic channel and at least a portion of a wall of the second fluidic channel, wherein:
the fluid-permeable medium is arranged such that fluid can be transported from the first fluidic channel, through the fluid-permeable medium, and into the second fluidic channel,
the fluid-permeable medium has a permeability pressure differential with respect to a fluid in the first fluidic channel, and
when a first pressure within the first fluidic channel is below a sum of the permeability pressure differential of the fluid-permeable medium with respect to the fluid and a second pressure within the second fluidic channel, the fluid is substantially prevented from being transported through an outlet of the first fluidic channel.

* * * * *